(12) United States Patent
Dittmer et al.

(10) Patent No.: US 7,497,412 B2
(45) Date of Patent: Mar. 3, 2009

(54) ADJUSTABLE PROJECTOR MOUNT WITH QUICK RELEASE DEVICE INTERFACE

(75) Inventors: Jay Dittmer, Prior Lake, MN (US); Paul Smith, Savage, MN (US)

(73) Assignee: Milestone AV Technologies LLC, Savage, MN (US)

( * ) Notice: Subject to any disclaimer, the term of this patent is extended or adjusted under 35 U.S.C. 154(b) by 0 days.

(21) Appl. No.: 11/429,472

(22) Filed: May 5, 2006

(65) Prior Publication Data

US 2007/0257178 A1 Nov. 8, 2007

Related U.S. Application Data

(62) Division of application No. 11/418,813, filed on May 5, 2006.

(51) Int. Cl.
*F16M 13/00* (2006.01)

(52) U.S. Cl. .................. 248/514; 248/222.11; 248/515; 248/518

(58) Field of Classification Search ................. 248/317, 248/674, 917, 343, 329, 342, 222.11, 222.12, 248/514, 515, 516, 518; 343/888, 882, 878
See application file for complete search history.

(56) References Cited

U.S. PATENT DOCUMENTS

| | | | |
|---|---|---|---|
| 4,080,629 A | | 3/1978 | Hammond et al. |
| 4,225,881 A | | 9/1980 | Tovi |
| 4,964,606 A | | 10/1990 | Beam et al. |
| 5,490,655 A | * | 2/1996 | Bates .......................... 248/329 |
| 5,551,658 A | | 9/1996 | Dittmer |
| 5,833,189 A | * | 11/1998 | Rossman et al. ....... 248/231.61 |
| 5,938,161 A | * | 8/1999 | Takeuchi et al. ............ 248/343 |
| 6,042,068 A | | 3/2000 | Tcherny |
| 6,341,927 B2 | | 1/2002 | Hampson et al. |
| 6,527,238 B2 | | 3/2003 | Shental et al. |
| 6,595,379 B1 | | 7/2003 | Powell |
| 6,606,887 B1 | | 8/2003 | Zimmer et al. |
| 6,619,161 B1 | | 9/2003 | Blair |
| 6,708,940 B2 | | 3/2004 | Ligertwood |
| 6,883,920 B2 | * | 4/2005 | Chen .......................... 353/119 |
| 6,986,491 B2 | * | 1/2006 | Anderson ................... 248/317 |
| D546,366 S | * | 7/2007 | Dittmer ..................... D16/235 |
| 2004/0211872 A1 | | 10/2004 | Dittmer et al. |
| 2007/0132655 A1 | * | 6/2007 | Lin ............................. 343/880 |

OTHER PUBLICATIONS

Chief Manufacturing Inc., *RPA Series Projector Mount with All-Points™ Security System, Chief Manufacturing Inc.*, Brochure, 2004, 4 pages.

* cited by examiner

*Primary Examiner*—Amy J. Sterling
(74) *Attorney, Agent, or Firm*—Patterson, Thuente, Skaar & Christensen PA

(57) ABSTRACT

A mount for attaching a projection device to an overhead structure includes a device interface operably attachable to the projection device with a plurality of fasteners. The device interface has a first portion and a second portion slidably disposed on the first portion. The first and second portions together define a plurality of retaining structures, each retaining structure for receiving a separate one of the plurality of fasteners. The second portion is selectively slidably shiftable relative to the first portion between a first latched position wherein each of the plurality of fasteners is received and retained in a separate one of the retaining structures and a second unlatched position wherein the plurality of fasteners is freely disengagable from the retaining structures.

20 Claims, 37 Drawing Sheets

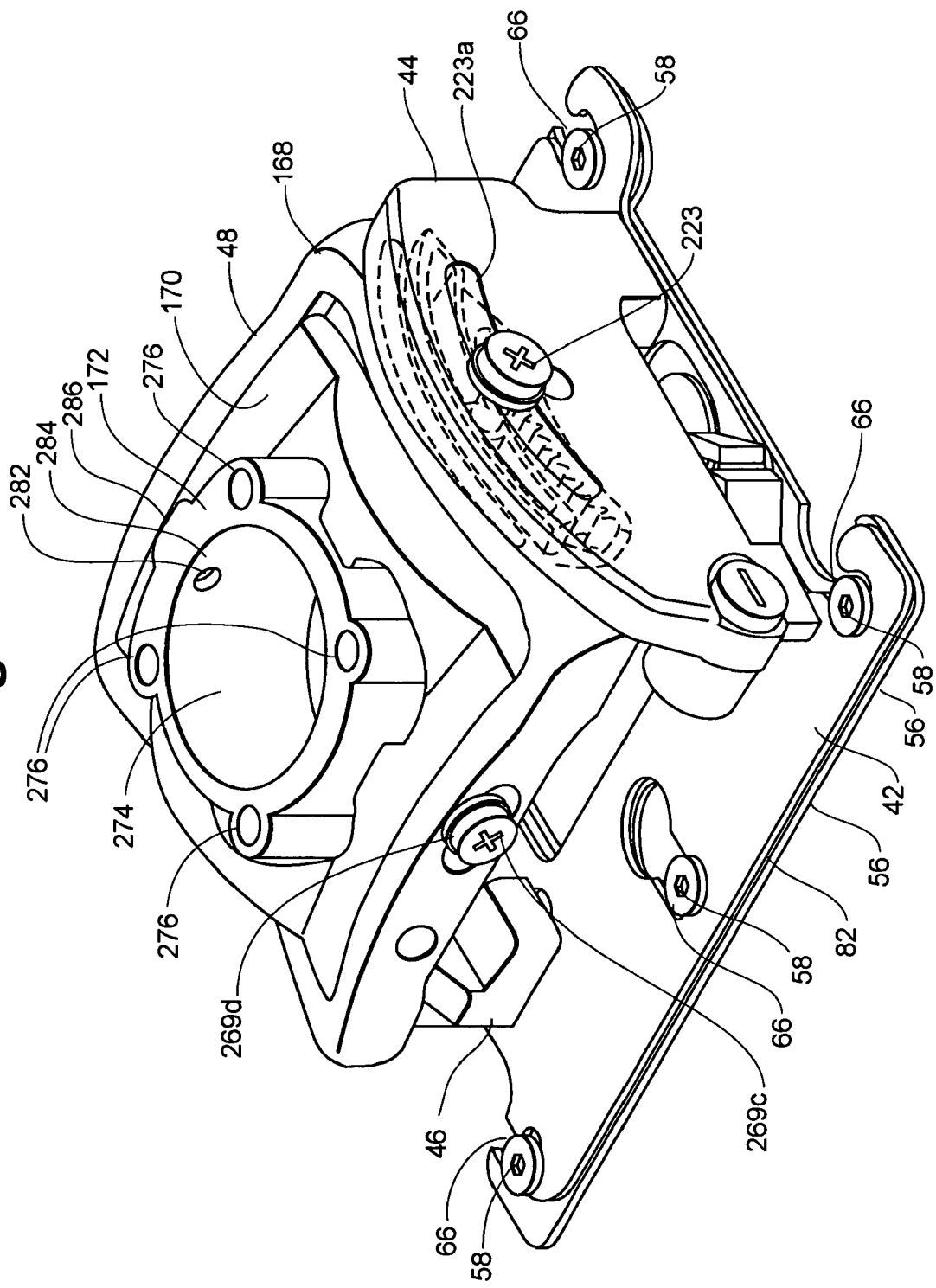

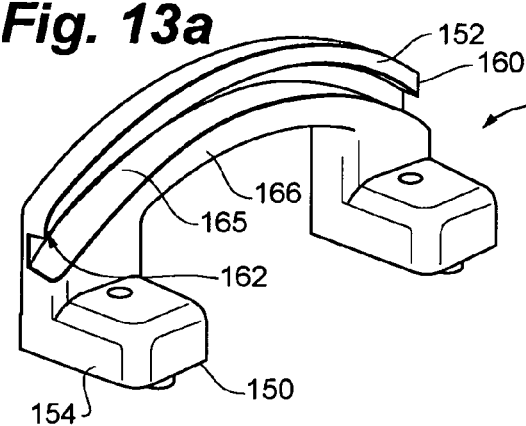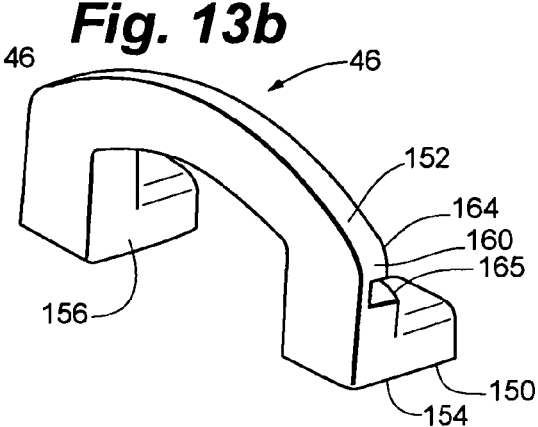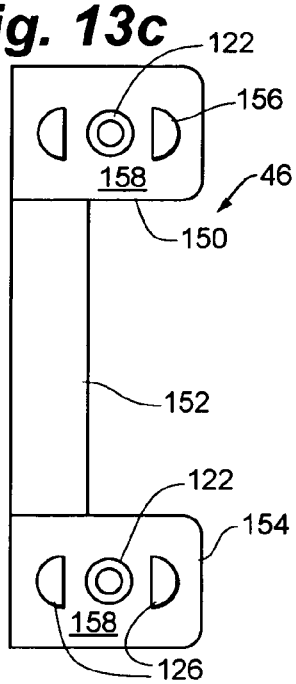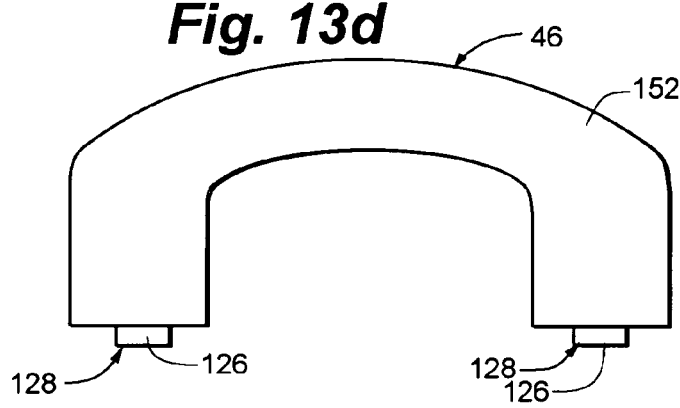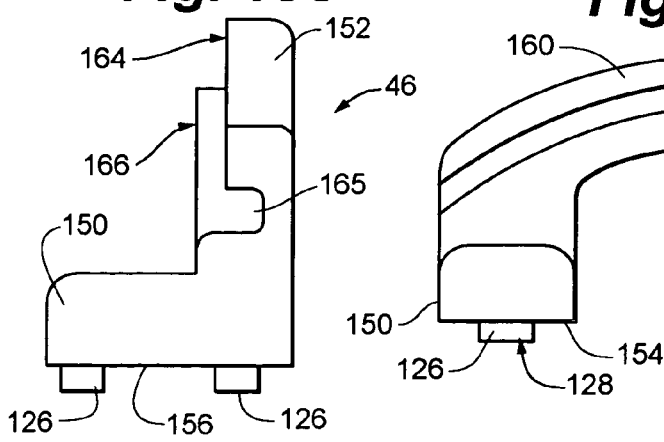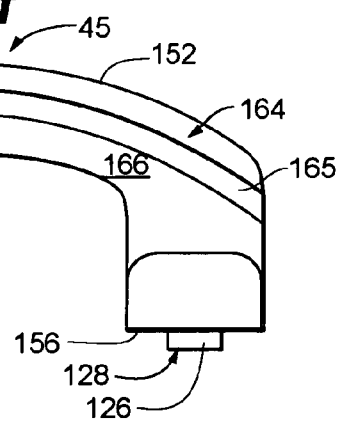

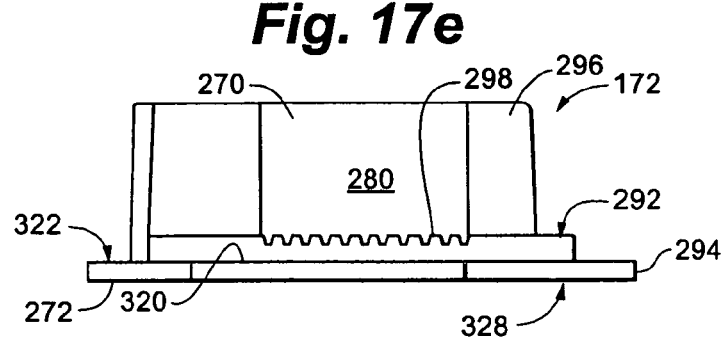
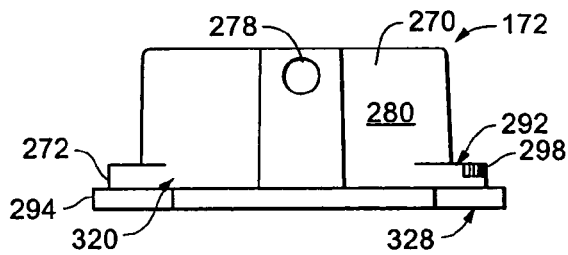
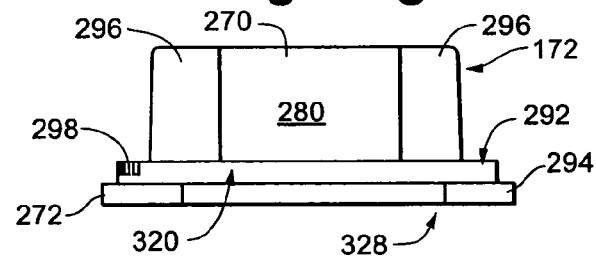
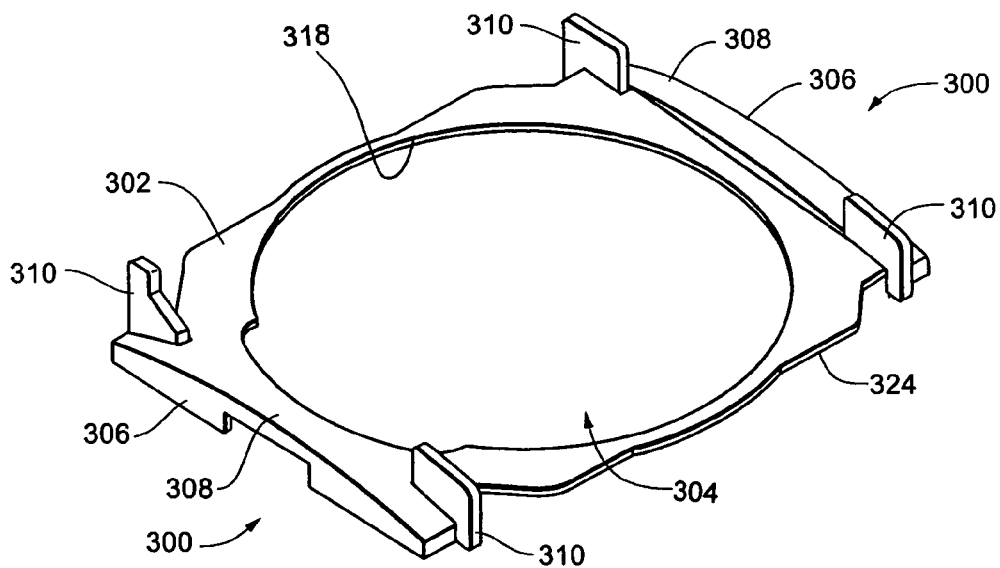

ADJUSTABLE PROJECTOR MOUNT WITH QUICK RELEASE DEVICE INTERFACE

RELATED APPLICATION

This application is a division of application Ser. No. 11/418,813 filed May 5, 2006 entitled ADJUSTABLE PROJECTOR MOUNT, commonly owned by the owners of the present application and filed on even date with this application, said application being fully incorporated herein by reference.

FIELD OF THE INVENTION

The present invention relates to mounting devices and more specifically to adjustable mounts for projectors.

BACKGROUND OF THE INVENTION

Multi-media presentations performed with video projection equipment have become very common for business and entertainment purposes. Often, the video projection equipment is a portable LCD projector that is placed on a table, cart, or stand in the room, with the image projected on a portion of the wall or a portable screen. Such impromptu arrangements, however, have a number of drawbacks. First, a considerable amount of time is often needed to position, aim, and focus the projector in advance of the presentation—time that is expended repeatedly whenever a different projector is set up. Further, it is often difficult to position a portable projector where it is not in the way of persons moving about in the room, or in the line of sight for those viewing the presentation. Moreover, the wires and cables used to connect the projector with the computer are in the open at ground level, presenting a tripping hazard and an opportunity for damage to the projector if someone comes in contact with them.

In view of these many drawbacks of portable projectors, mounting devices have been developed to enable mounting of a projection device from the ceiling of a presentation room. Such devices have generally been successful in alleviating some of the problems associated with a projector at ground level having exposed wires. These prior ceiling mounting devices have presented certain drawbacks, however.

In U.S. Pat. No. 5,490,655, a device for mounting a video/data projector from a ceiling or wall is disclosed in which struts are used to form channels for supporting the projector and to conceal cabling. The channels, however, result in a rather bulky device that may be difficult to harmonize with the aesthetic environment of a presentation room. In addition, adjustment of the projector for roll, pitch, and yaw may be time consuming and difficult due to the generally limited adjustment capability of the device. Also, the projector may be vulnerable to theft by anyone with common hand tools and access to the device during unattended hours. Other prior devices such as the low-profile LCD projector mount is disclosed in U.S. Pat. No. 6,042,068, offer a relatively more compact mount arrangement, but still offer only a limited range of projector pitch and yaw adjustment, and no roll adjustment at all.

A projector mount is described in U.S. patent application Ser. No. 10/821,659, which alleviates many of the problems of prior devices. U.S. patent application Ser. No. 10/821,659 is owned by the owners of the present invention and is hereby fully incorporated herein by reference. The disclosed mount provides independent projector roll, pitch, and yaw adjustments along with theft deterrence in the form of coded fasteners connecting each separate portion of the mount. Fine adjustment for position may be hampered, however, due to the number of separate fasteners to be loosened and tightened to enable adjustment (six for the pitch and roll adjustments), and by the tendency for the weight of the projector to pull the mount out of adjustment unless the projector is held in the desired position. Also, although the theft resistant security fasteners inhibit theft of the device, convenience of use of the projector device is compromised by the need to remove the security fasteners with a special tool in order to move the projector to a new location.

A need still exists in the industry for a projector mount combining the features of relatively quick and easy precision projector position adjustment in roll, pitch, and yaw, orientations, high security and theft deterrence, and compact size.

SUMMARY OF THE INVENTION

The present invention addresses the need of the industry for a projector mount combining the features of relatively quick and easy precision projector position adjustment in roll, pitch, and yaw, orientations, high security and theft deterrence, and compact size. According to an embodiment of the invention, A mount for attaching a projection device to an overhead structure includes a device interface operably attachable to the projection device and a device orientation adjustment structure operably coupled with the device interface. The device orientation adjustment structure includes at least one upright extending from the device interface and a support structure interface extending from and operably coupled with the at least one upright. The support structure interface has structure enabling it to be operably coupled, either directly or with a suspension member, with the overhead structure. The upright and the support structure interface have cooperating guide structures defining a first axis of rotation. The support structure interface may include a first portion and a second portion operably coupled so as to define a second axis of rotation generally transverse to the first axis of rotation, wherein the device interface is separately selectively shiftable about both the first and second axes of rotation when the support structure interface is fixedly coupled with the overhead structure, and wherein neither of the first and second axes of rotation extend through any portion of either the device interface or the device orientation adjustment structure.

According to the embodiment, the support structure interface may include a third portion operably coupled with the first and second portions so as to define a third axis of rotation generally transverse to both the first and second axes of rotation, wherein the device interface is selectively rotatable about the third axis of rotation. Moreover, the mount may include a single selectively adjustable friction element for any one or all of the first, second, and third portions of the support structure interface to frictionally resist shifting of the device interface about the first, second, or third, axes of rotation.

According to embodiments of the invention, any or all of the first, second, or third axes of rotation may extend through the projection device. Preferably, these axes will extend through or proximate the center of gravity of the projection device thereby balancing the projection device relative to each axis. When so balanced, the projection device may retain its position during adjustment without being held.

In an embodiment, a mount for attaching a projection device to an overhead structure may include a device interface operably attachable to the projection device and a device orientation adjustment structure operably coupled with the device interface. The device orientation adjustment structure may include at least one upright extending from the device interface and a support structure interface extending between the at least one upright and having a first portion operably coupled with the upright. The support structure interface may have structure adapting it to be fixedly coupled with the overhead structure. The upright and the support structure interface have cooperating structure defining a first axis of rotation, wherein the device interface is selectively shiftable about the first axis of rotation, and wherein the first axis of rotation does not extend through any portion of either the device interface or the device orientation adjustment structure.

In an embodiment, a visual projection system adapted to be attached to the ceiling of a structure includes a projection device, a device interface operably coupled to the projection device, and a device orientation adjustment structure operably coupled with the device interface. The device orientation adjustment structure includes means for defining a pitch adjustment axis for the projection device, wherein the projection device is selectively shiftable about the pitch adjustment axis, and wherein the pitch adjustment axis does not extend through any portion of either the device interface or the device orientation adjustment structure. The pitch adjustment axis may extend proximate a center of gravity of the projection device. The system may further include means for defining a roll adjustment axis generally transverse to the pitch adjustment axis, wherein the projection device is separately selectively shiftable about both the pitch and roll adjustment axes, and wherein neither of the pitch and roll adjustment axes extend through any portion of either the device interface or the device orientation adjustment structure. The roll adjustment axis may extend proximate a center of gravity of the projection device. Further, the system may include means for defining a yaw adjustment axis generally transverse to both the pitch and roll axes, wherein the projection device is selectively rotatable about the yaw adjustment axis. yaw adjustment axis may also extend proximate a center of gravity of the projection device. A single selectively adjustable friction element may be employed to resist rotation about any or all of the axes.

In a further embodiment of the invention, a mount for attaching a projection device to an overhead structure, includes a device interface operably attachable to the projection device and a device orientation adjustment structure operably coupled with the device interface. The device orientation adjustment structure may include at least one upright extending from the device interface and a support structure interface extending from the upright and having a first portion operably coupled with the upright. The upright and the support structure interface have cooperating guide structures defining a first axis of rotation, wherein the device interface is selectively shiftable about the first axis of rotation, and wherein the first portion of the support structure interface defines a first plurality of gear teeth engagable with a drive element to selectively shift the device interface about the first axis of rotation. According to the invention, the drive element may be a screwdriver, preferably with a Phillips tip.

The support structure interface of a mount according to an embodiment may include a second portion, the first and second portions of the support structure interface operably coupled so as to define a second axis of rotation generally transverse to the first axis of rotation. The device interface may be separately selectively shiftable about both the first and second axes of rotation when the support structure interface is fixedly coupled with the overhead structure. The second portion of the support structure interface may define a second plurality of gear teeth engagable with the drive element to selectively shift the device interface about the second axis of rotation.

Further, the support structure interface may further include a third portion operably coupled with the first and second portions so as to define a third axis of rotation generally transverse to both the first and second axes of rotation. The device interface may be selectively rotatable about the third axis of rotation. The third portion of the support structure interface may define a third plurality of gear teeth engagable with the drive element to selectively rotate the device interface about the third axis of rotation.

In a further embodiment, a mount for attaching a projection device to an overhead structure includes a device interface operably attachable to the projection device with a plurality of fasteners. The device interface has a first portion and a second portion slidably disposed on the first portion. The first and second portions together define a plurality of retaining structures, each retaining structure for receiving a separate one of the plurality of fasteners. The second portion is selectively slidably shiftable relative to the first portion between a first latched position wherein each of the plurality of fasteners is received and retained in a separate one of the retaining structures and a second unlatched position wherein the plurality of fasteners is freely disengagable from the retaining structures. A device orientation adjustment structure is operably coupled with the device interface. The device orientation adjustment structure may include at least one or a pair of spaced apart uprights extending from the device interface and a support structure interface extending from the at least upright or between the spaced apart uprights. The support structure interface has a first portion operably coupled with each upright, and is adapted to be fixedly coupled with the overhead structure. The uprights and the support structure interface have cooperating guide structures defining a first axis of rotation, wherein the device interface is selectively shiftable about the first axis of rotation. Each of the first and second portions of the device interface each may be a plate structure. Each retaining structure of the plurality of retaining structures may be a first notch in a periphery of the plate structure of the first portion and a second corresponding notch in a periphery of the plate structure of the second portion.

A control may be operably coupled with the device interface and arranged to slidably shift the second portion relative to the first portion. Further, a lock mechanism may be operably coupled with the device interface. The lock mechanism is selectively shiftable between a first unlocked position wherein the second portion of the device interface is freely shiftable relative to the first portion, and a second locked position wherein the lock mechanism inhibits shifting of the second portion from the latched to the unlatched position. The lock mechanism may include a lock cylinder with structure for receiving a key, the lock structure rotatable with the key to shift the lock mechanism between the locked and unlocked positions.

As a security feature, the uprights may be secured to the device interface with at least one fastener, with the fastener being inaccessible for removal when the projection device is attached to the device interface. The support structure interface may also include a second portion, the first and second portions of the support structure interface operably coupled so as to define a second axis of rotation generally transverse to the first axis of rotation, wherein the device interface is separately selectively shiftable about both the first and second axes of rotation when the support structure interface is fixedly coupled with the overhead structure. A retaining structure may be employed for retaining the first and second portions support structure interface in operable engagement. Again, as a security feature, the retaining structure may be secured with at least one fastener, with the fastener securing the retaining structure being inaccessible for removal when the projection device is attached to the device interface.

A feature and advantage of certain embodiments of the invention is that a mount for a projection device enables adjustment of the position of the projection device for pitch, roll, and yaw, in a single relatively low profile device.

A feature and advantage of certain embodiments of the invention is that a single selectively adjustable friction element is provided for each of the pitch, roll, and yaw adjustments of the mount, whereby only such element need be manipulated during adjustment about the given axis.

A feature and advantage of certain embodiments of the invention is that any or all of the pitch, roll, and yaw axes may pass through or proximate the center of gravity of the projection device, thereby balancing the projection device and enabling it to maintain position during adjustment without being held.

A feature and advantage of certain embodiments of the invention is that a geared adjustment mechanism may be provided to enable adjustment about any or all of the pitch, roll, and yaw axes. The geared adjustment mechanism may enable adjustment with a screwdriver such as a Phillips tip screwdriver.

A feature and advantage of certain embodiments of the invention is that the device interface of the mount may have a quick disconnect feature, wherein fastening buttons on the projection device are selectively engaged and released with a single lever control. A key lock may be provided to prevent unauthorized actuation of the lever control and removal of the projection device.

A feature and advantage of certain embodiments of the invention is that the mount for a projection device may only be disassembled when the projection device is not attached to the mount. To this end, all fasteners for disassembly are located so as to be accessible for removal only from the direction of the projection device. Unauthorized attempts to remove the projection device by disassembly of the mount are thus thwarted.

BRIEF DESCRIPTION OF THE FIGURES

FIG. 11 is a perspective view of the mount of FIG. 4 with the guide assembly shown in phantom to reveal the support structure interface;

FIG. 13a is a rear perspective view of one of the guide assemblies of a mount according to an embodiment of the invention;

FIG. 13b is a front perspective view of the guide assembly of FIG. 13a;

FIG. 13c is a bottom plan view of the guide assembly of FIG. 13a;

FIG. 13d is a front elevation view of the guide assembly of FIG. 13a;

FIG. 13e is a side elevation view of the guide assembly of FIG. 13a;

FIG. 13f is a rear elevation view of the guide assembly of FIG. 13a;

FIG. 14b is a front perspective view of the guide assembly of FIG. 14a;

FIG. 14c is a bottom plan view of the guide assembly of FIG. 14a;

FIG. 14d is a front elevation view of the guide assembly of FIG. 14a;

FIG. 14e is a side elevation view of the guide assembly of FIG. 14a;

FIG. 14f is a rear elevation view of the guide assembly of FIG. 14a;

FIG. 15b is an opposing perspective view of the outer frame of FIG. 15a;

FIG. 15c is a side elevation view of the outer frame of FIG. 15a;

FIG. 15d is an opposing side elevation view of the outer frame of FIG. 15a;

FIG. 15e is a front elevation view of the outer frame of FIG. 15a;

FIG. 15f is a rear elevation view of the outer frame of FIG. 15a;

FIG. 16b is an opposing perspective view of the inner frame of FIG. 16a;

FIG. 16c is a bottom plan view of the inner frame of FIG. 16a;

FIG. 16d is a front elevation view of the inner frame of FIG. 16a;

FIG. 16e is a side elevation view of the inner frame of FIG. 16a;

FIG. 16f is an opposing side elevation view of the inner frame of FIG. 16a;

FIG. 16g is a rear elevation view of the inner frame of FIG. 16a;

FIG. 17b is an opposing perspective view of the yaw coupler of FIG. 17a;

FIG. 17c is a top plan view of the yaw coupler of FIG. 17a;

FIG. 17d is a side elevation view of the yaw coupler of FIG. 17a;

FIG. 17e is a side elevation view from the yaw coupler of FIG. 17d from the opposing side;

FIG. 17f is another side elevation view of the yaw coupler of FIG. 17a;

FIG. 17g is a side elevation view from the yaw coupler of FIG. 17f from the opposing side;

FIG. 18a is a perspective view of the bearing plate of the support structure interface of a mount according to an embodiment of the invention;

FIG. 18b is an opposing perspective view of the bearing plate of FIG. 18a;

DETAILED DESCRIPTION OF THE PREFERRED EMBODIMENTS

The accompanying Figures depict embodiments of the mount of the present invention, and features and components thereof. Any references to front and back, right and left, top and bottom, upper and lower, and horizontal and vertical are intended for convenience of description, not to limit the present invention or its components to any one positional or spacial orientation. Any dimensions specified in the attached Figures and this specification may vary with a potential design and the intended use of an embodiment of the invention without departing from the scope of the invention. Moreover, the Figures may designate, for reference purposes, the relative directions of x-y-z coordinate axes as applied to the invention. Any reference herein to movement in an x-axis direction, a y-axis direction, or a z-axis direction, or to rotation about an x-axis, a y-axis or a z-axis, relates to these coordinate axes. The y-axis is oriented fore-and-aft in relation to the mounted device, the z-axis is vertical and the x-axis is perpendicular to the z-axis and the y-axis, and is oriented laterally from side-to-side in relation to the mounted device. For the purposes of the present application, pitch is defined as angular displacement about the x-axis, roll is defined as angular displacement about the y-axis, and yaw is defined as angular displacement about the z-axis.

Figure 1:
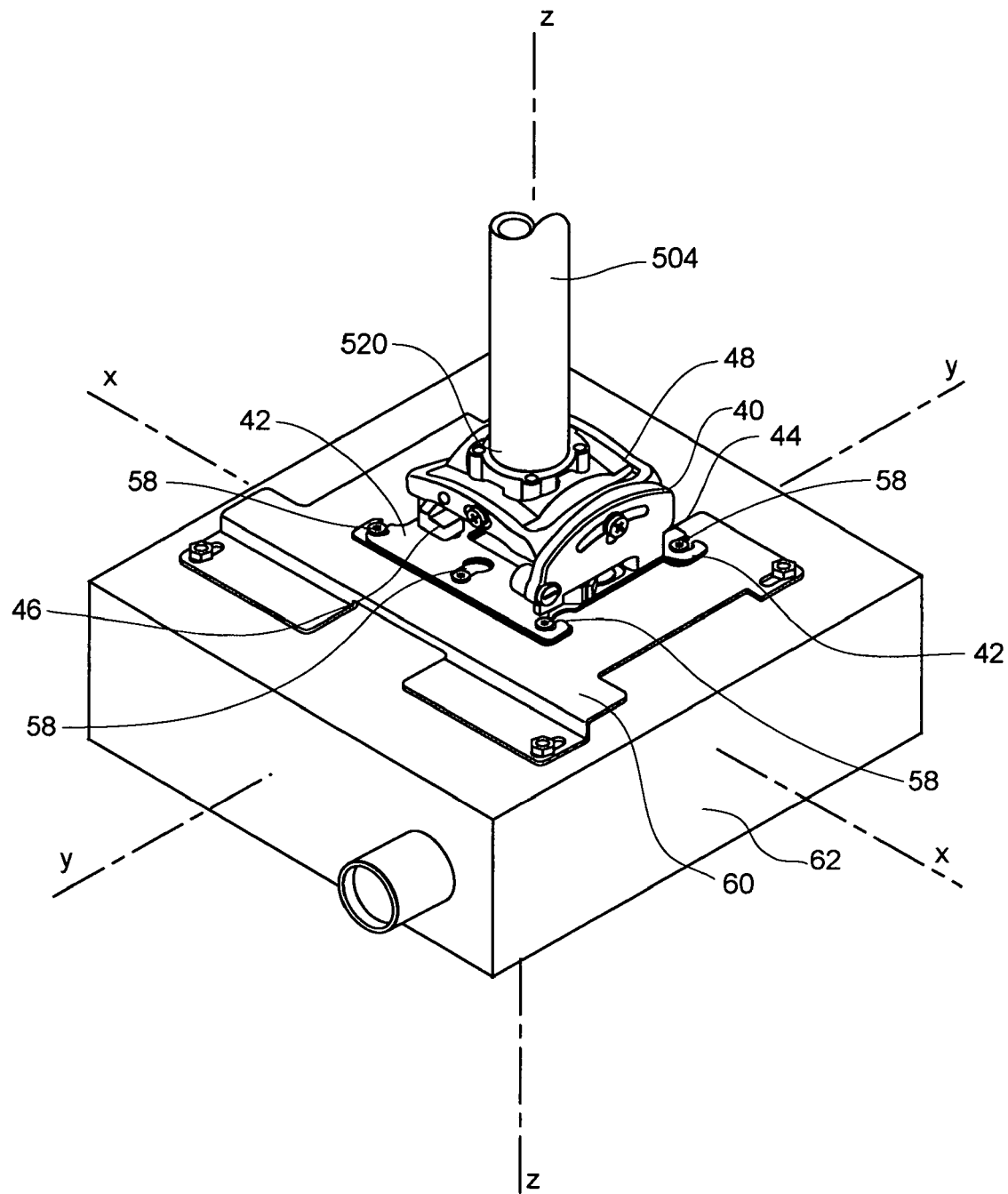
FIG. 1 is a perspective view of a mount according to an embodiment of the invention coupling a device with a suspension structure.
Figure 2:
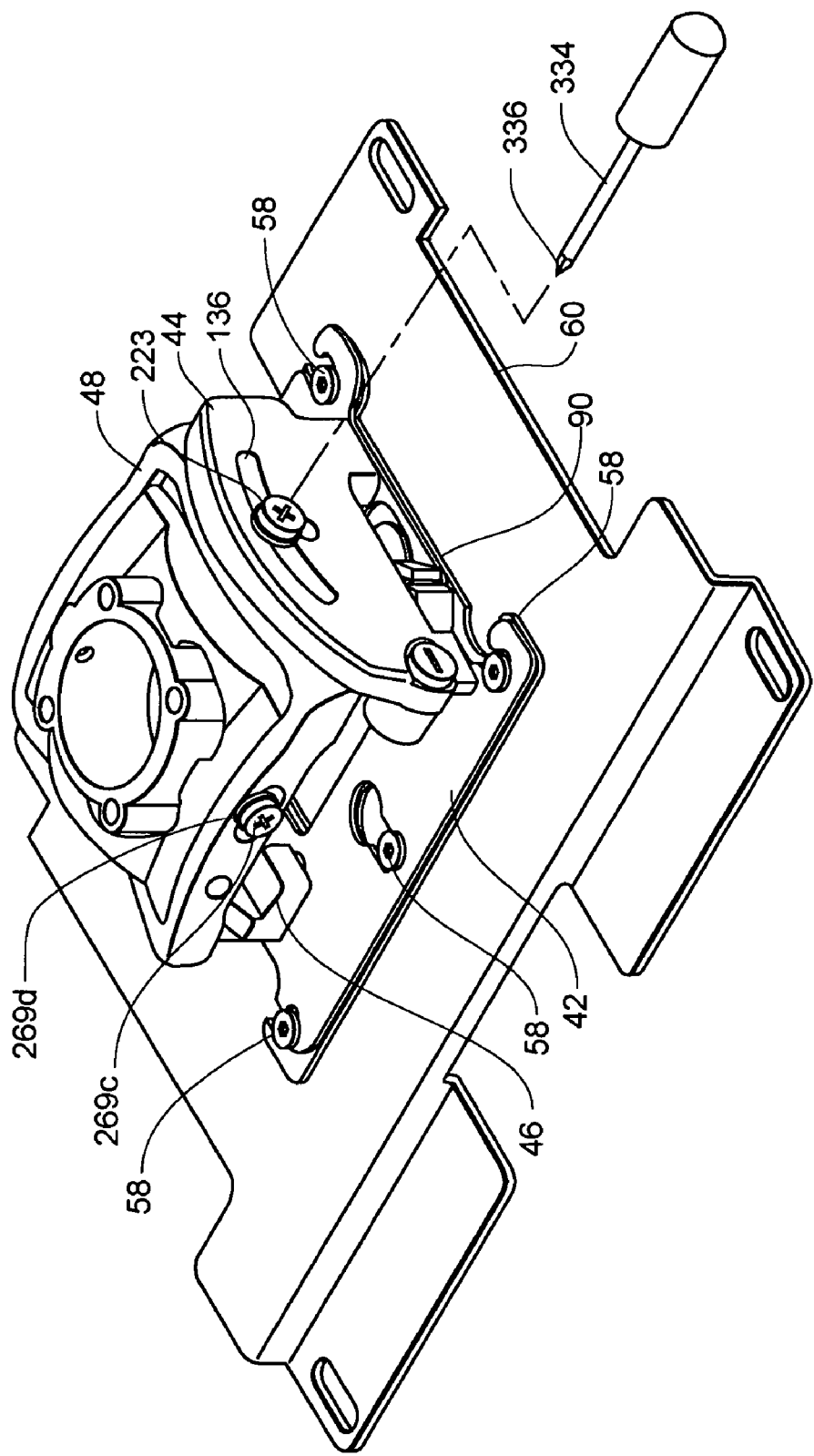
FIG. 2 is a perspective view of a mount and interface plate according to an embodiment of the invention.
Figure 3:
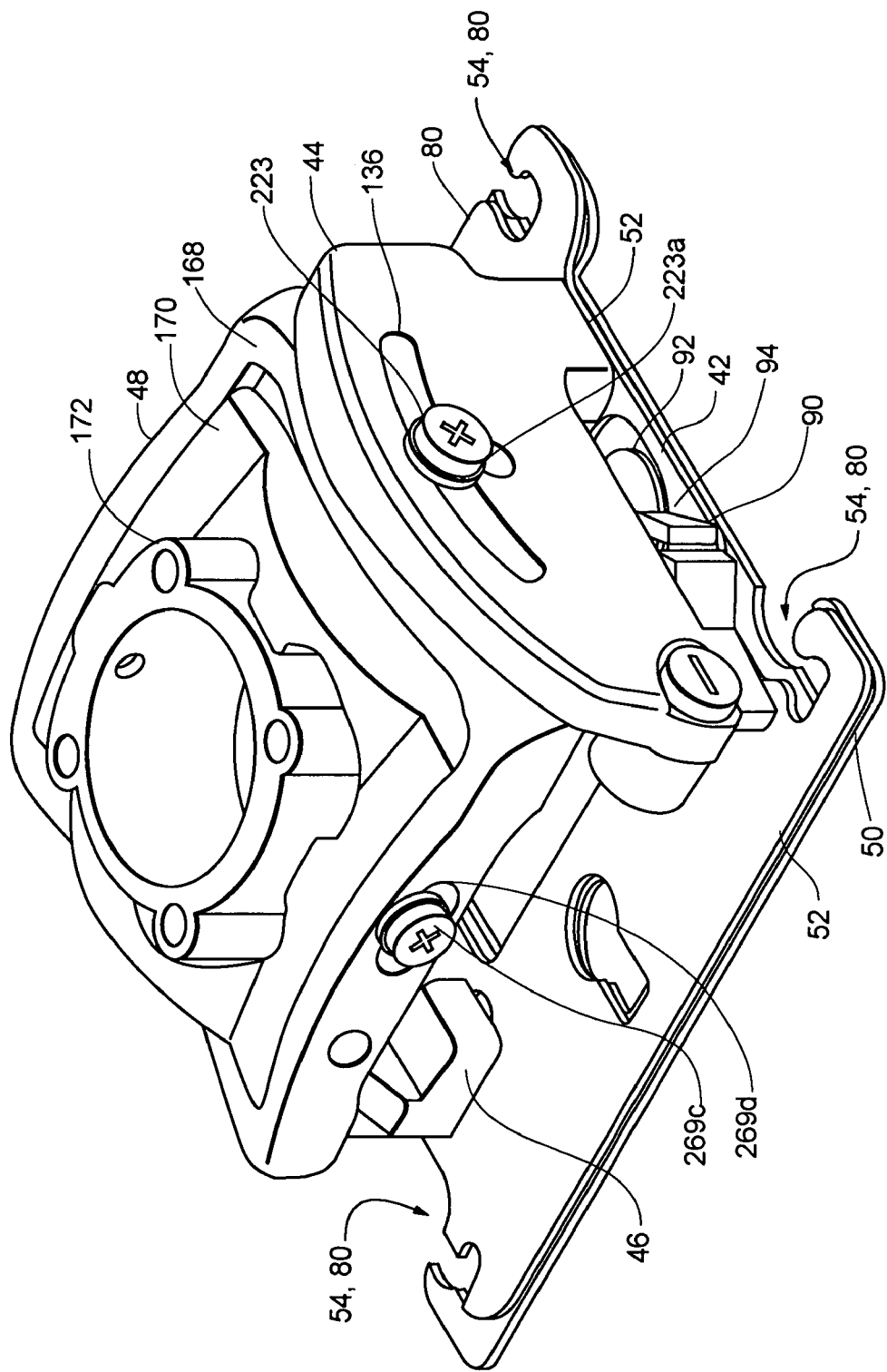
FIG. 3 is a perspective view of a mount according to an embodiment of the invention.
Figure 4:
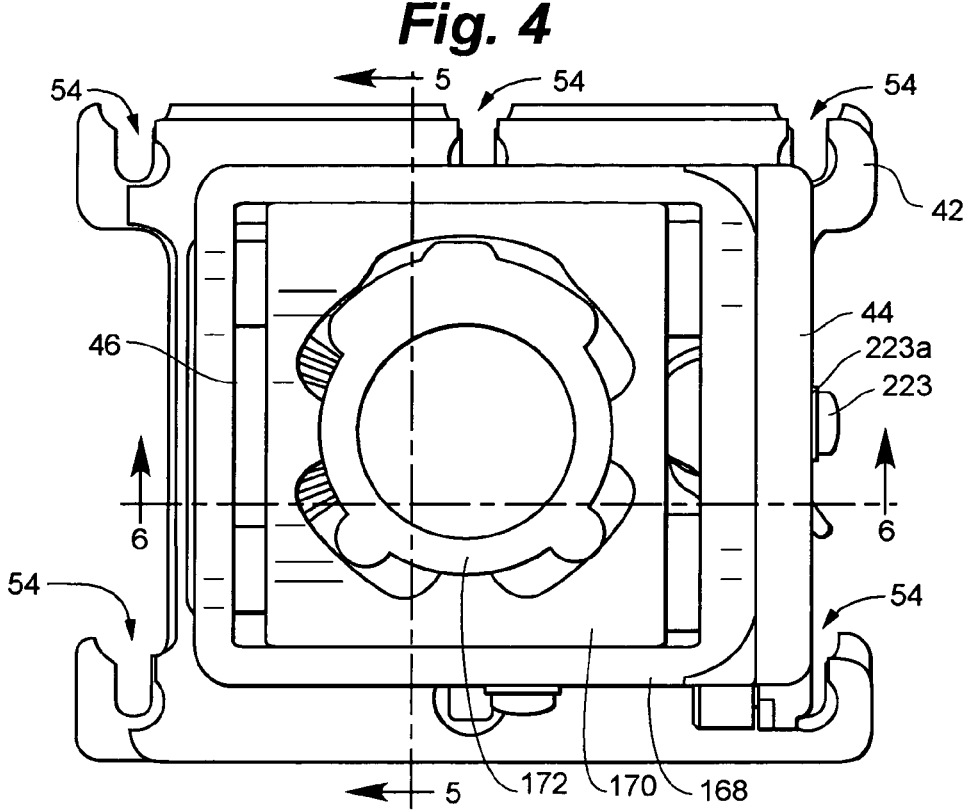
FIG. 4 is a top plan view of a mount according to an embodiment of the invention.
Figure 5:
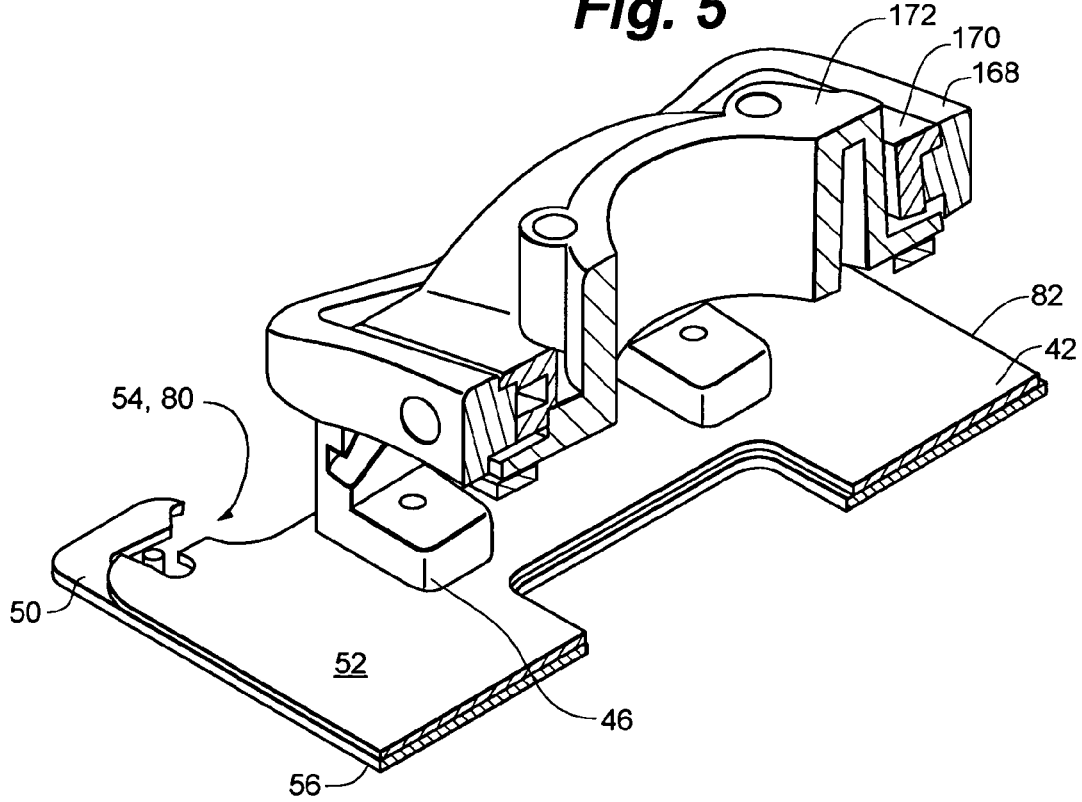
FIG. 5 is a perspective cross-sectional view taken at section 5-5 of FIG. 4.
Figure 6:
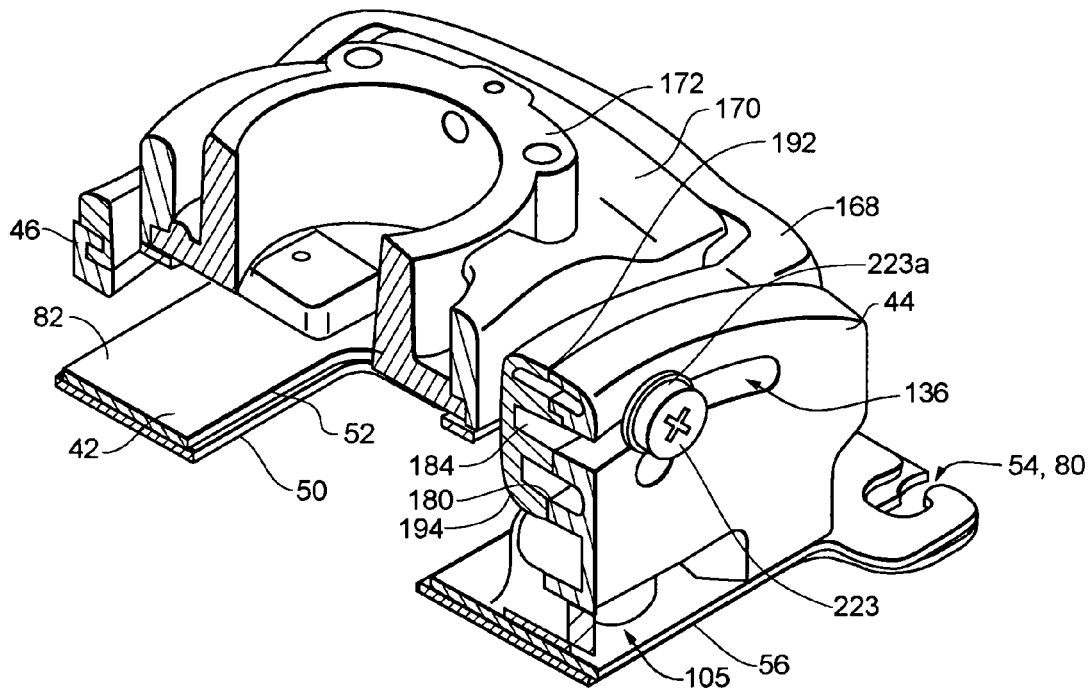
FIG. 6 is a perspective cross-sectional view taken at section 6-6 of FIG. 4.
Figure 7:
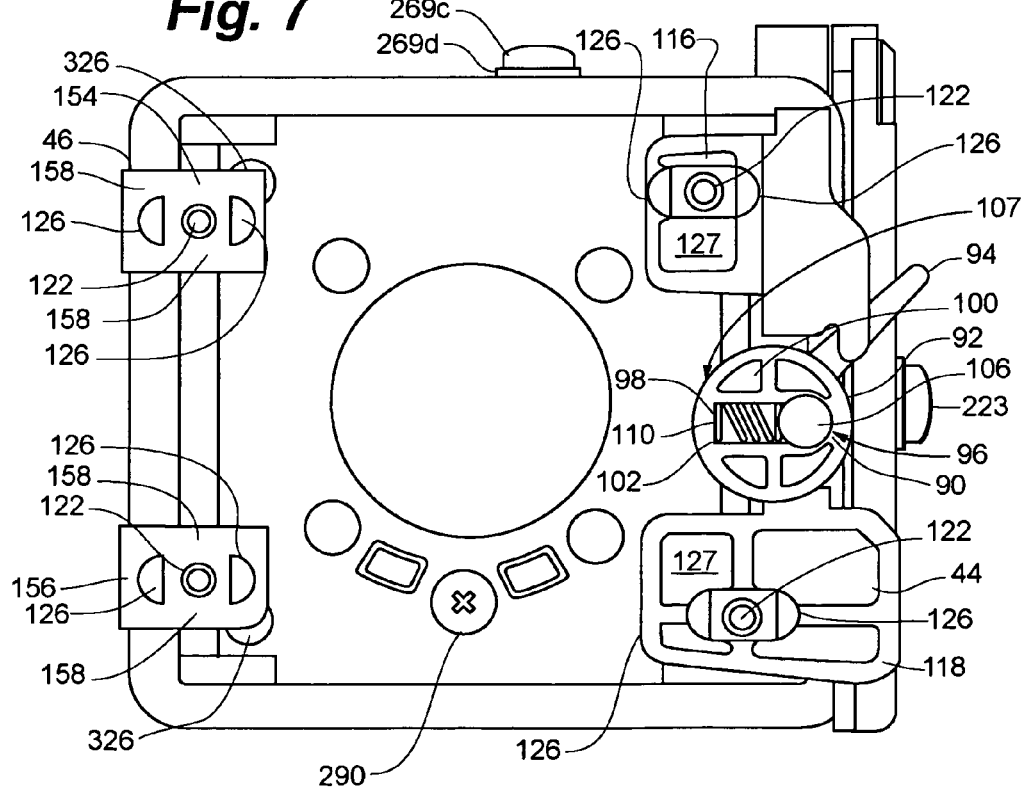
FIG. 7 is a bottom plan view of the mount of FIG. 4 with the base plate assembly removed.

As depicted in FIGS. 1-3, projector mount 40 generally includes a device interface in the form of base assembly 42, and a device orientation adjustment structure which includes guide assemblies 44, 46, and a support structure interface in the form of support structure interface assembly 48.

Figure 8:
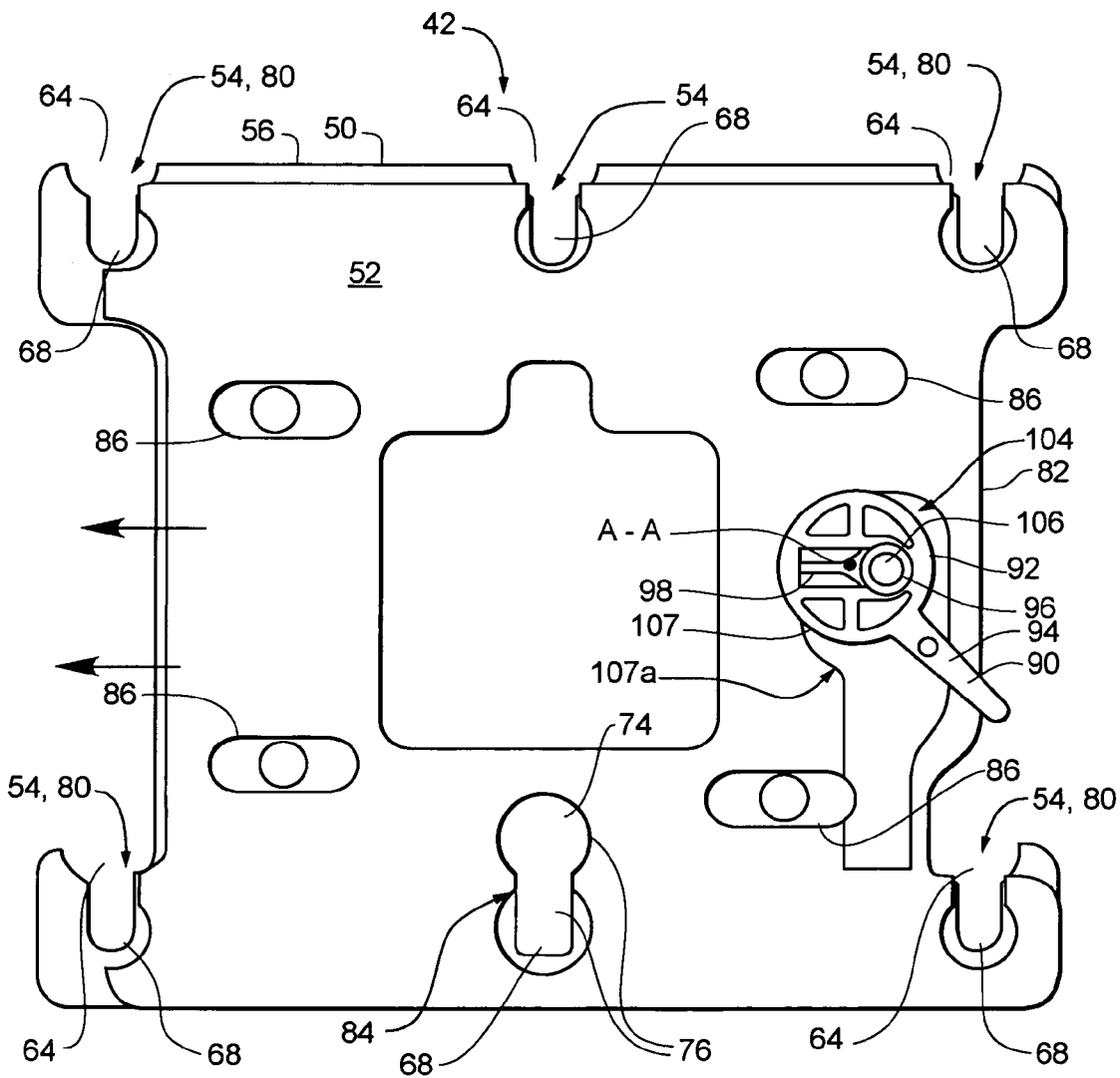
FIG. 8 is a top plan view of the base assembly of the mount of FIG. 4.
Figure 9:
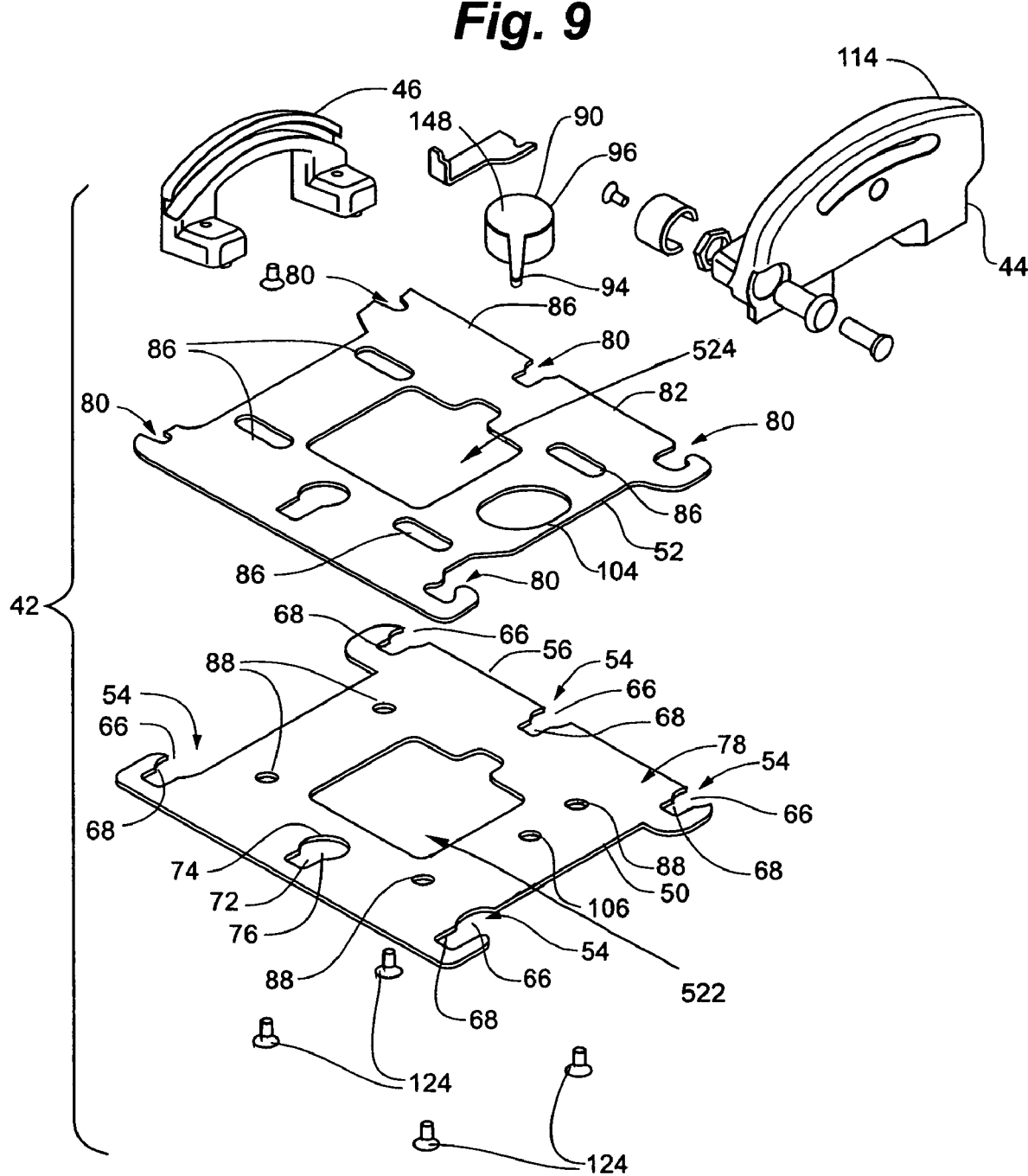
FIG. 9 is an exploded perspective view of the base assembly and guide assemblies of the mount of FIG. 4.

In an embodiment of the invention depicted in FIGS. 8-9, base assembly 42 generally includes base plate 50 and locking plate 52. Base plate 50 has notches 54 defined in periphery 56, each for receiving a fastening button 58 that is operably attached to interface plate 60 or directly to device 62. Each notch 54 has an enlarged outer region 64 sized to accommodate head portion 66 of the fastening button 58, and an inner channel region 68 sized to accommodate shank portion 70 of the fastening button 58. Base plate 50 may further define slot 76 spaced inwardly from periphery 56. Slot 76 may be generally keyhole shaped, with an enlarged portion 74 at one end for receiving the head portion 66 of a fastening button 58 therethrough and a narrower channel portion 72 sized to closely fit around shank portion 70 of the fastening button 58.

Locking plate 52 is slidably disposed on upper surface 78 of base plate 50, and has notches 80 defined in periphery 82 corresponding with notches 54 of base plate 50, as well as slot 84 corresponding with slot 76. Elongate slots 86 are defined in locking plate 52 corresponding with fastener apertures 88 in base plate 50.

Lock lever 90 generally includes barrel portion 92 with handle 94 extending radially outwardly therefrom. Barrel portion 92 defines bore 96 offset from central axis A-A. Cavity 98 extends from bore 96 on bottom side 100 of barrel portion 92, and receives spring 102. Barrel portion 92 is received through oblong aperture 104 defined in locking plate 52 with bottom 100 bearing against base plate 50. Post 106 extends upwardly from upper surface 78 of base plate 50 and is received in bore 96 in barrel portion 92 of lock lever 90 so that lock lever 90 is rotatable about post 106. Spring 102 bears against back side 110 of cavity 98 and post 106 to bias lock lever 90 in its rotational travel. As lock lever 90 is rotated, side surface 107 bears against periphery 107a of oblong aperture 104, causing locking plate 52 to be shifted relative to base plate 50 in the direction of the arrows in FIG. 8, in turn causing fastening buttons 58 engaged in notches 54 to be clamped or released by the relative motion between the plates.

Guide assembly 44, depicted in FIGS. 14a-14f, generally includes pedestal portion 112 and upright portion 114. Pedestal portion 112 generally includes a pair of spaced apart legs 116, 118, defining lock lever aperture 120 therebetween. Each leg 116, 118, defines an aperture 122 having interior threads for receiving a threaded fastener 124 to secure guide assembly 44 to base assembly 42. Spacer projections 126 are defined on each side of aperture 122, extending from bottom surface 127 of each leg 116, 118, a distance slightly greater than the thickness of locking plate 52. Guide assembly 44 is secured to base plate 50 with fasteners 124 extending through apertures 88 in base plate 50 and elongate slots 86 in locking plate 52, threading into apertures 122 in each leg 116, 118. Bottom surface 128 of each spacer projection 126 abuts upper surface 78 of base plate 50, so that bottom surface 127 of each leg is spaced apart from upper surface 78 a distance slightly greater than the thickness of locking plate 52 to enable locking plate 52 to slide between legs 116, 118, and base plate 50.

Upright portion 114 defines upper channel 130, middle guide channel 132, and lower channel 134. Friction slot 136 extends through from back wall 138 of middle guide channel 132 to outer surface 139. Adjustment aperture 140 is defined through upright portion 114 from back wall 142 of lower channel 134 to outer surface 139. Cam retainer tab 144 extends inwardly from inner side 146 of upright portion 114 between legs 116, 118, and bears on upper surface 148 of lock lever 90 to retain it in position. Handle 94 of lock lever 90 extends outwardly between legs 116, 118.

Guide assembly 46, depicted in FIGS. 13a-13f, generally includes pedestal portion 150 and upright portion 152. As with guide assembly 44, pedestal portion 150 generally includes a pair of legs 154, 156, each defining an aperture 122 having interior threads for receiving a threaded fastener 124 to secure guide assembly 44 to base assembly 42. Again, spacer projections 126 are defined on each side of aperture 122, extending from bottom surface 158 of each leg 154, 156, a distance slightly greater than the thickness of locking plate 52. Guide assembly 46 is secured to base plate 50 with fasteners 124 extending through apertures 88 in base plate 50 and elongate slots 86 in locking plate 52, threading into apertures 122 in each leg 154, 156. Bottom surface 128 of each spacer projection 126 abuts upper surface 78 of base plate 50, so that bottom surface 158 of each leg is spaced apart from upper surface 78 a distance slightly greater than the thickness of locking plate 52 to enable locking plate 52 to slide between legs 154, 156, and base plate 50.

Upright portion 152 defines rib 160 on inner surface 162. The inward face 164 of rib 160 is offset slightly from face 166 of inner surface 162 below channel 165.

Figure 10:
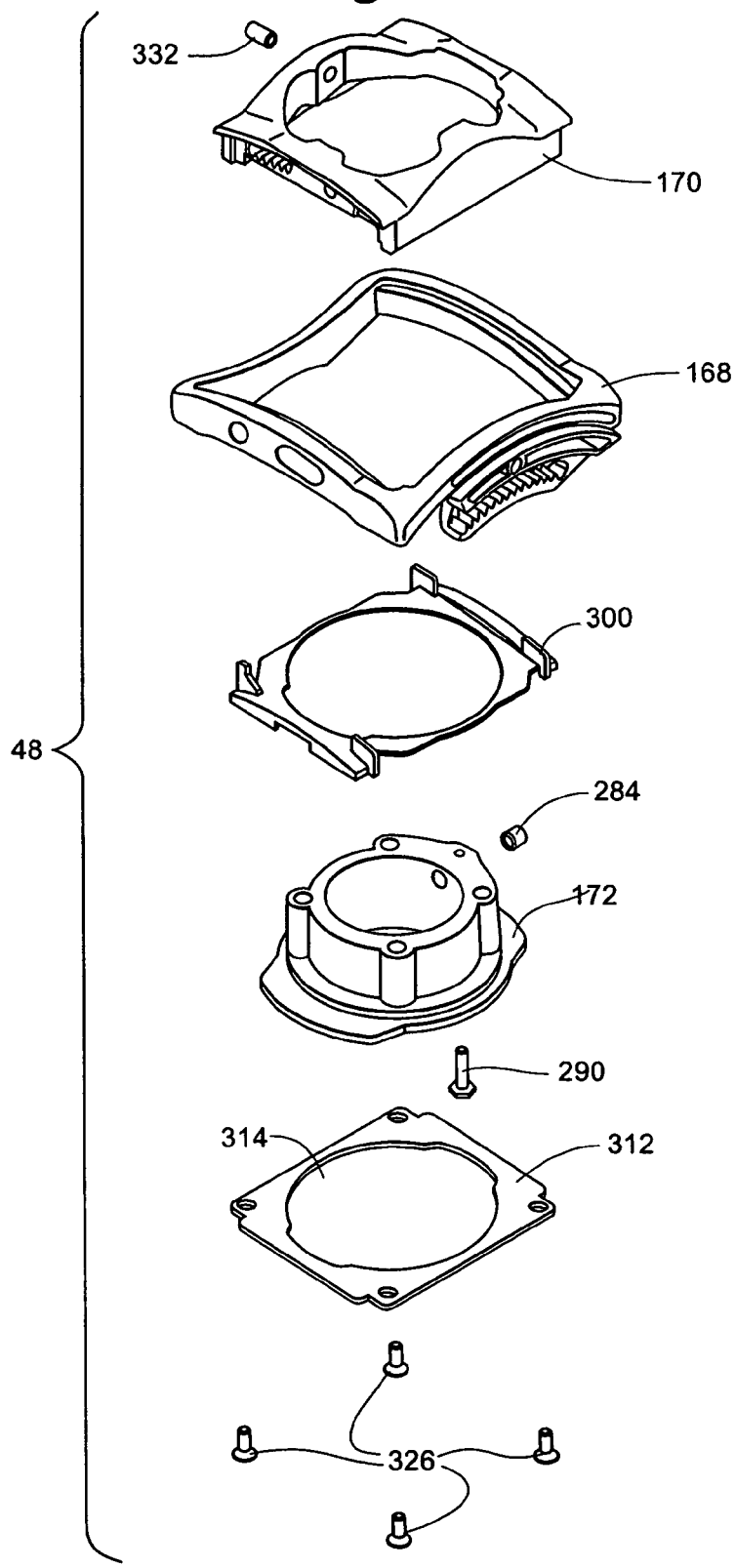
FIG. 10 is an exploded perspective view of the support structure interface of the mount of FIG. 4.

Support structure interface assembly 48, depicted in exploded form in FIG. 10, generally includes outer frame 168, inner frame 170, and yaw coupler 172. Outer frame 168, as depicted in FIGS. 15a-15f, generally includes side members 174, 176, and end members 177a and 177b, defining central opening 178. Side member 174 has arcuate projecting portion 180 on outer surface 181, defining channels 182, 184, on either side of bore 186. Shoulder 188 is defined along bottom edge 190 of projecting portion 180. Channels 192, 194, are defined in side member 174 above and below projecting portion 180 respectively. Lower wall surface 196 of channel 194 defines upwardly projecting gear teeth 198 in channel 194.

Side member 176 has outer surface 200 defining guide channel 202. The portion 204 of outer surface 200 below guide channel 202 is offset slightly from portion 206 above guide channel 202. End members 177a, 177b, have raised regions 208, 210, formed on inner surfaces 212, 214, respectively. The raised regions 208, 210, define shoulders 216, 218, above and below each of the raised regions 208, 210. End member 177a has outer surface 219 and defines elongate slot 220 and adjustment aperture 222 therethrough.

Outer frame 168 is received between guide assemblies 44 and 46 with arcuate projecting portion 180 slidably engaged in middle guide channel 132 of guide assembly 44 and rib 160 of guide assembly 46 slidably engaged in guide channel 202. Guide assemblies 44, 46, and outer frame 168 thereby together define an arcuate path for pitch adjustment of the device 62. Friction screw 223 receives friction washer 223a and extends through friction slot 136 and threads into bore 186. Friction washer 223a thus bears against outer surface 139 of guide assembly 44 when friction screw 223 is tightened to provide a selectable amount of frictional resistance to relative sliding movement between outer frame 168 and guide assemblies 44, 46. Adjustment aperture 140 opens into channel 194 to enable access to gear teeth 198 for fine pitch adjustment as further described below.

Inner frame 170 generally includes side walls 224, 226, and end walls 228, 230, defining interior opening 232, as depicted in FIGS. 16a-16g. Each side wall 224, 226, has an inwardly projecting guide pad 234 defining an arcuate inner surface 236. Side wall 224 defines adjustment aperture 238 and set screw aperture 240. Outer surface 242 of end wall 228 defines channel 244 having side surface 246 with inwardly facing gear teeth 248, along with recesses 250, 252, extending upwardly from bottom surface 254. Inner surface 255 of end wall 228, has inwardly projecting guide pad 234 defining an arcuate inner surface 236. Threaded bore 256 extends into end wall 228 from outer surface 242. Outer surface 258 of end wall 230 defines recesses 260, 262, extending upwardly from bottom surface 254. Bottom surface 254 defines recesses 264 extending around interior opening 232, and threaded bores 266 proximate corners 268. Each end wall 228, 230, has arcuate lip 269 defined along upper edge 269a.

Inner frame 170 is received in central opening 178 of outer frame 168 with bottom surface 269b of each arcuate lip 269 slidably bearing on shoulders 216 of outer frame 168, thereby defining an arcuate path for roll adjustment of device 62. Friction screw 269c receives friction washer 269d and extends through elongate slot 220 and threads into threaded bore 256. Friction washer 269d thus bears against outer surface 219 of outer frame 168 when friction screw 269c is tightened to provide a selectable amount of frictional resistance to relative sliding movement between outer frame 168 and inner frame 170. Adjustment aperture 222 opens into channel 244 to enable access to gear teeth 248 for fine roll adjustment as further described below.

Yaw coupler 172, depicted in FIGS. 17a-17g, generally includes barrel portion 270 and flange portion 272. Barrel portion 270 defines central bore 274 and apertures 276, which in an embodiment of the invention, are equidistantly spaced surrounding central bore 274. Set screw aperture 278 extends through barrel portion wall 270 from outer surface 280 through to surface 282 inside central bore 274, and is threaded to receive a set screw 284. Blocking screw bore 286 crosses through set screw aperture 278, extending from bottom surface 328. Blocking screw bore 286 is also threaded to receive blocking screw 290 to block access to set screw 284. Surface 282 may be threaded to receive pipe support column 291 as further described hereinbelow.

Flange portion 272 generally includes apron portion 292 and retaining portion 294. As depicted, apron portion 292 is raised slightly above retaining portion 294 and extends between bosses 296 surrounding apertures 276. Gear teeth 298 are formed on at least one part of apron portion 292.

Figure 18B:
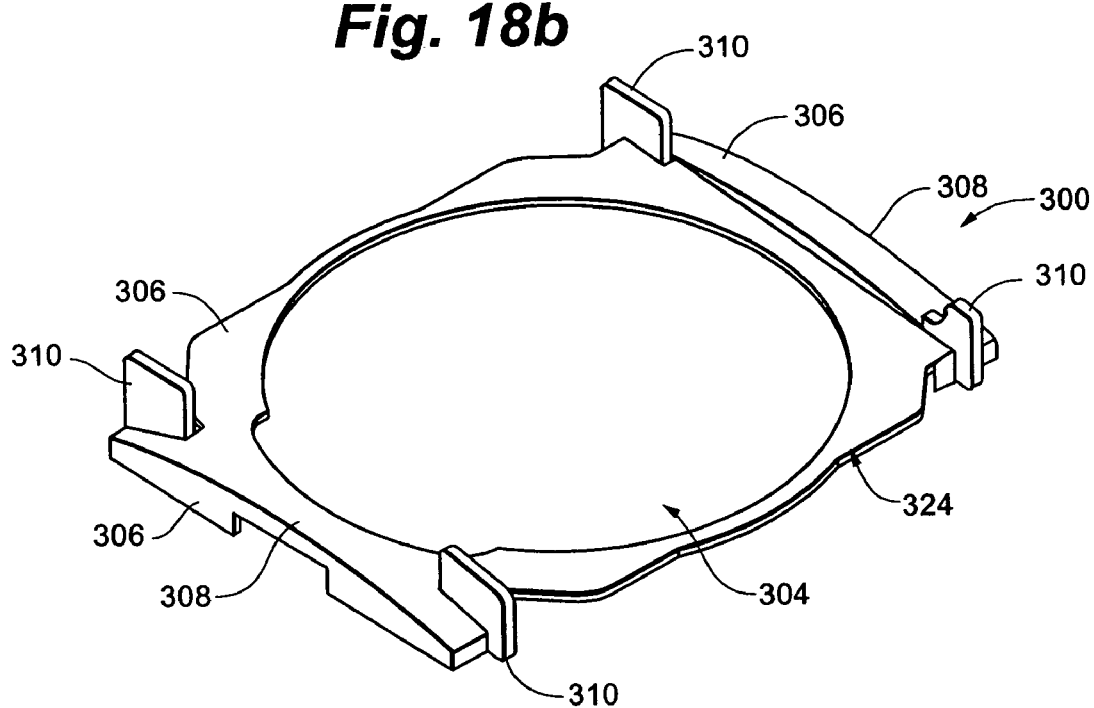
Figure 19:
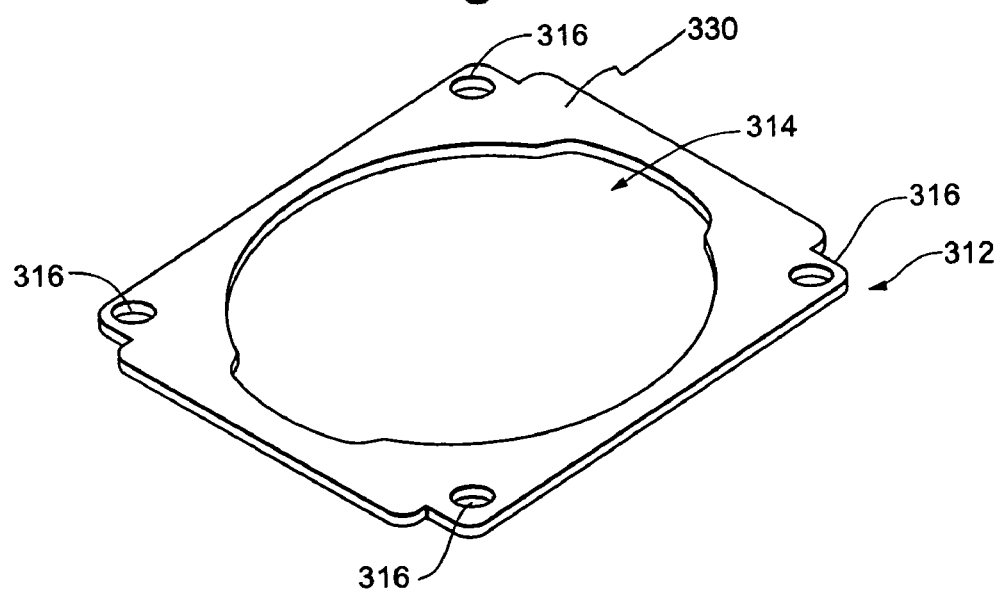
FIG. 19 is a perspective view of the retainer plate of the support structure interface of a mount according to an embodiment of the invention.

Bearing plate 300 depicted in FIGS. 18a-18b, includes central portion 302 defining aperture 304, and opposing guide walls 306, each having an arcuate top surface 308. Upwardly projecting locating tabs 310 are formed at each corner of bearing plate 300. Retainer plate 312 defines central aperture 314 and fastener holes 316 at each corner.

Bearing plate 300 is received on bottom surface 254 of inner frame 170 with each locating tab 310 engaging recesses 250, 252, 260, 262, and arcuate top surface 308 engaging shoulders 218 of outer frame 168. Yaw coupler 172 is received in interior opening 232 of inner frame 170 with arcuate inner surfaces 236 of guide pads 234, confronting and guiding outer surface 280 of barrel portion 270. Inner surface 318 of aperture 304 in bearing plate 300 confronts outer surface 320 of apron portion 292. Upper surface 322 of flange portion 272 confronts bottom surface 324 of bearing plate 300. Retainer plate 312 is secured on the bottom of inner frame 170 and is secured in place with fasteners 326 threaded into threaded bores 266. Bottom surface 328 of yaw coupler 172 bears on upper surface 330 of retainer plate 312, and retaining portion 294 of flange portion 272 is slidingly received between retainer plate 312 and bearing plate 300. Yaw coupler 172 is thus selectively rotatable within inner frame 170 to enable yaw adjustment of device 62.

Set screw 332 threads into set screw aperture 240 and contacts outer surface 280 of yaw coupler 172. When set screw 332 is tightened, yaw coupler 172 may thus be fixed at a particular desired rotational position within inner frame 170. Adjustment aperture 238 opens onto gear teeth 298 to enable fine yaw adjustment as further described below.

An alternative embodiment of the invention is depicted in FIGS. 29-34 in which base assembly 420 includes a single base plate 400. Base plate 400 has notches 402 defined in periphery 404, each for receiving a fastening button 58 that is operably attached to interface plate 60 or directly to device 62. Each notch 402 has an enlarged outer region 406 sized to accommodate head portion 66 of the fastening button 58, and an inner channel region 408 sized to accommodate shank portion 70 of the fastening button 58. Base plate 400 may further define slot 410 spaced inwardly from periphery 404. Slot 410 may be generally keyhole shaped, with an enlarged portion 412 at one end for receiving the head portion 66 of a fastening button 58 therethrough and a narrower channel portion 414 sized to closely fit around shank portion 70 of the fastening button 58.

Base plate 400 further defines fastener apertures 416 for receiving fasteners 418 to secure guide assemblies 44, 46, to top side 420. Apertures 422 are disposed on either side of each aperture 416 for receiving spacer projections 126 of guide assemblies 44, 46, to enable the bottom surface of each guide assembly 44, 46, to fit flush with top side 420.

Another alternative embodiment of the invention is depicted in FIGS. 35-41 in which base assembly 42 is coupled to support structure interface assembly 48 with a single upright 424. In the depicted embodiment, upright 424 defines upper retaining structure 426 in the form of guide slot 428, and lower retaining structure 430 in the form of guide slot 432. Lower wall 434 of guide slot 428 has raised portion 436 extending longitudinally in the slot. Slide block 438 is slidably disposed in guide slot 428, and is secured to outer frame 168 with pin 440. Lower surface 442 of slide block 438 is conformingly shaped with raised portion 436 so as to retain slide block 438 in guide slot 428 laterally. It will be appreciated that pin 440 may be replaced with a fastener (not shown) threaded into outer frame 168 to enable selective friction adjustment. Guide slot 432 defines circumferential rib 444. Guide wheel 446 has groove 448 extending around its circumference, and is rotatably mounted on outer frame 168. Circumferential rib 444 is received in groove 448, so that guide wheel 446 is retained in guide slot 432. Support structure interface assembly 48 is thus retained in slidable engagement with upright 424 by the combination of slide block 438 in guide slot 428 and guide wheel 446 in guide slot 432. Again, upright 424 and base assembly 42 with any device 62 attached thereto are selectively shiftable about a pitch adjustment axis x-x defined at the center of curvature of guide slots, 428, 432. Upright 424 is coupled to base assembly 42 with a pair of spaced apart legs 448, 450.

Figure 24:
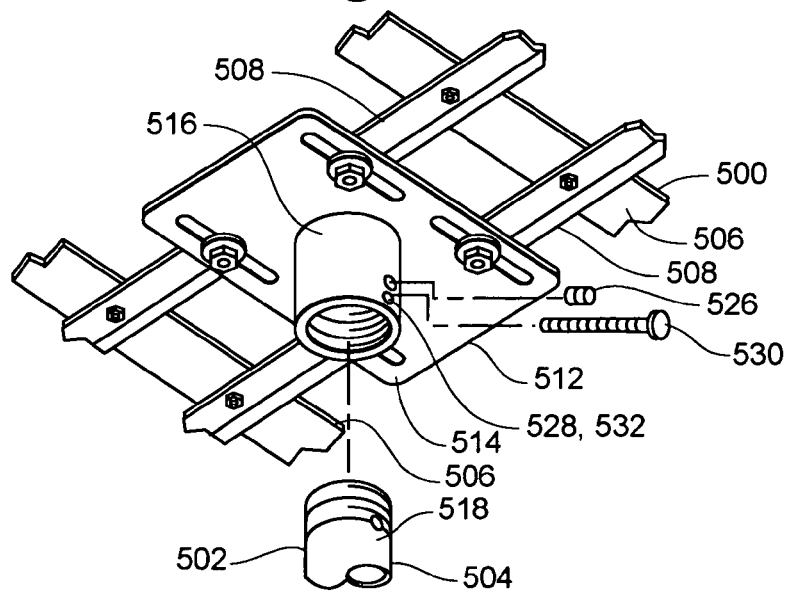
FIG. 24 is a perspective view of a mount for attaching a suspension member to a ceiling assembly according to the invention.

To mount device 62 to a ceiling assembly 500, a support structure such as a suspension member 502, in the form of threaded pipe hanger 504 may be secured to the ceiling assembly 500 by any suitable method. As depicted in FIG. 24, ceiling assembly 500 may be a floor/ceiling or roof assembly of a building, including parallel structural members 506, which may be trusses, I-beams, wooden joists, or any other such structural member. A pair of channels 508 is positioned spanning adjacent parallel structural members 506, and are fastened or welded in place. A hanger bracket 512 may then be fastened or welded to the channels 508. Hanger bracket 512 has a plate portion 514 and a pipe nipple 516, which is positioned so as to face downwardly. One end 518 of threaded pipe hanger 504 is threaded into pipe nipple 516. The other end 520 of threaded pipe hanger 504 is threaded into central bore 274 of yaw coupler 172, so that device 62 is suspended from the ceiling assembly by threaded pipe hanger 504. Set screw 284 is then tightened securely to fix yaw coupler 172 in position on threaded pipe hanger 504. Once set screw 284 is fully tightened, blocking screw 290 may be threaded into blocking screw bore 286 from below, and tightened with a screwdriver inserted upwardly through aperture 522 in base plate 50 and aperture 524 in locking plate 52. Advantageously, blocking screw 290 prevents access to set screw 284 thereby preventing it from being loosened or removed as a means of unauthorized removal of the device 62. Further, since access to blocking screw 290 is only from below, it cannot be accessed for loosening or removal once device 62 is attached.

For security purposes, pipe hanger 504 may be fixed within pipe nipple 516 by a tamper resistant setscrew 526 inserted through tapped hole 528. For the purposes of the present application, the term "tamper resistant" relative to a fastener means a fastener that has coding that corresponds to coding of a tool for installation and removal of the fastener. The fastener is generally removable by normal means only with the tool, and the tool is generally not available to members of the general public. Examples of tamper resistant fasteners are disclosed in U.S. patent application Ser. No. 10/821,659, previously incorporated herein by reference. Alternatively, particularly where the structural connection of pipe hanger 504 is above a concealing structure such as a suspended ceiling, pipe hanger 504 may be fixed to pipe nipple 516 by welding, or with a fastener 530 inserted through a hole 532 drilled through the threaded connection of pipe hanger 504 and pipe nipple 516.

Figure 25:
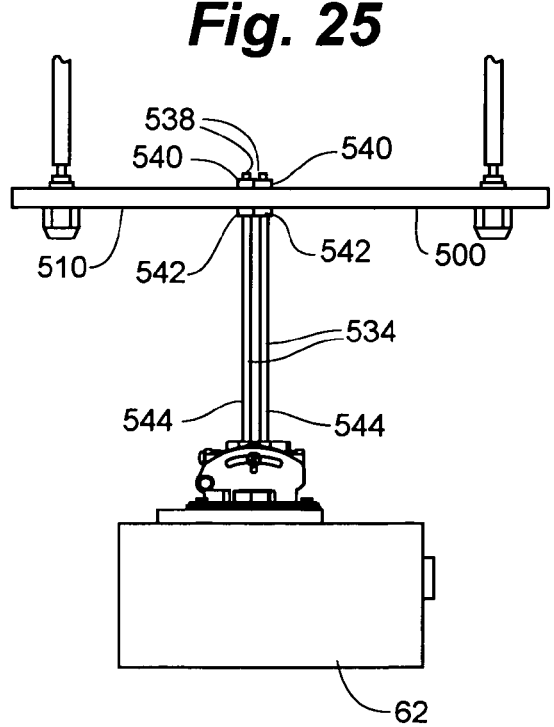
FIG. 25 is a side elevation view of a mount according to the invention coupling a device with a ceiling assembly.
Figure 26:
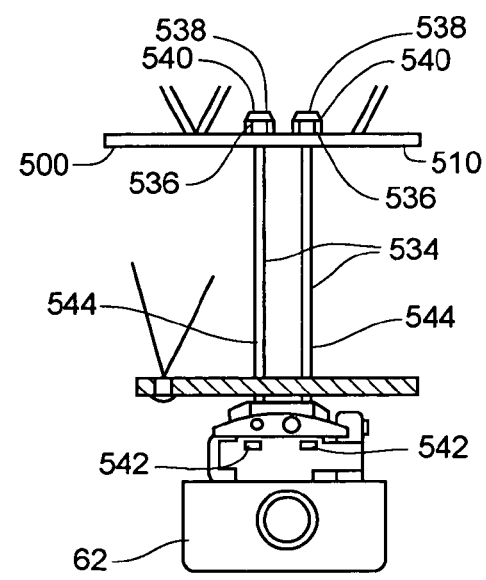
FIG. 26 is a front elevation view of a mount according to the invention coupling a device with a ceiling assembly.
Figure 27:
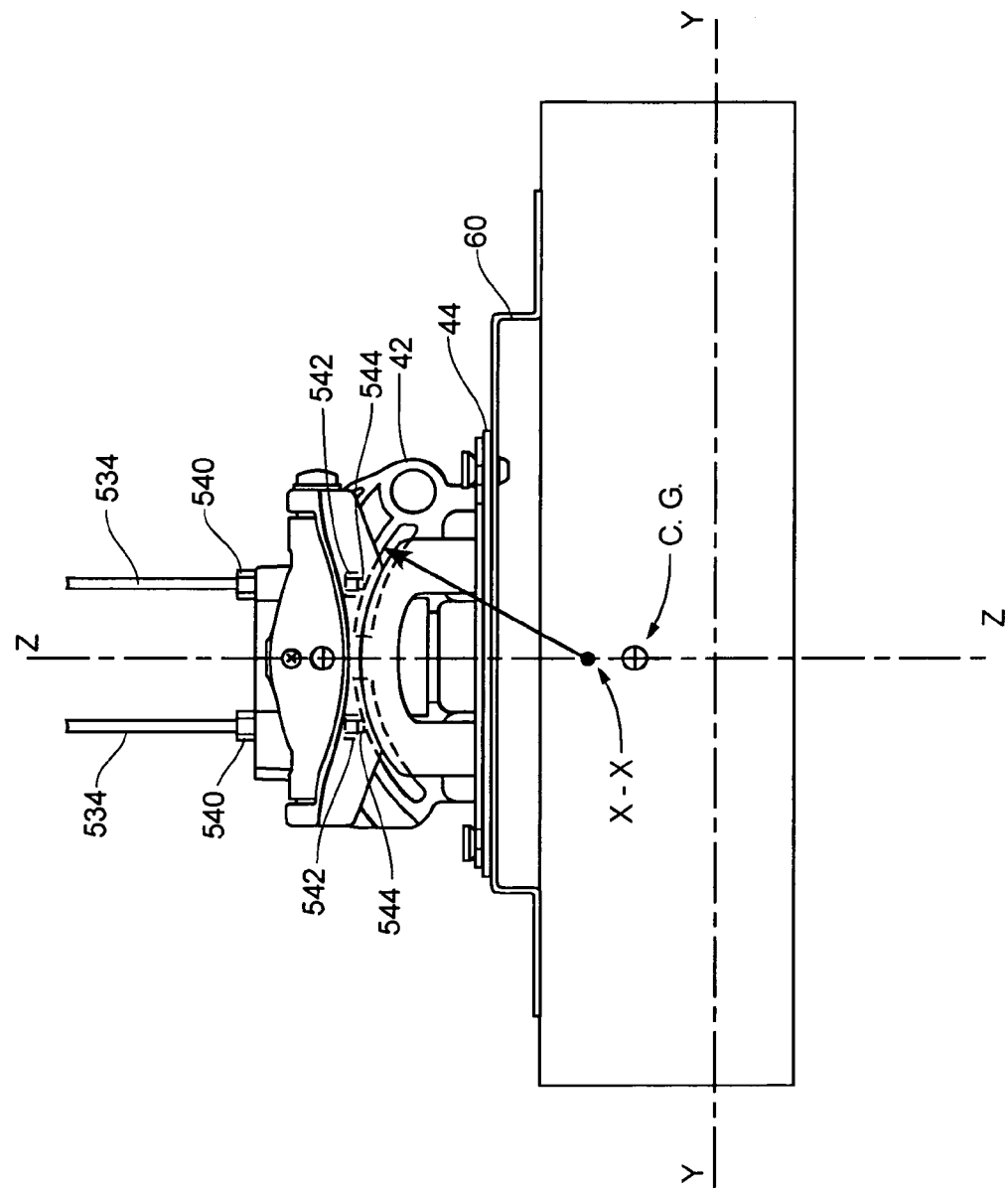
FIG. 27 is a side elevation view of a mount according to the invention coupling a device with a ceiling assembly, depicting the relationship of the device rotation axes with the center of gravity of the device.
Figure 28:
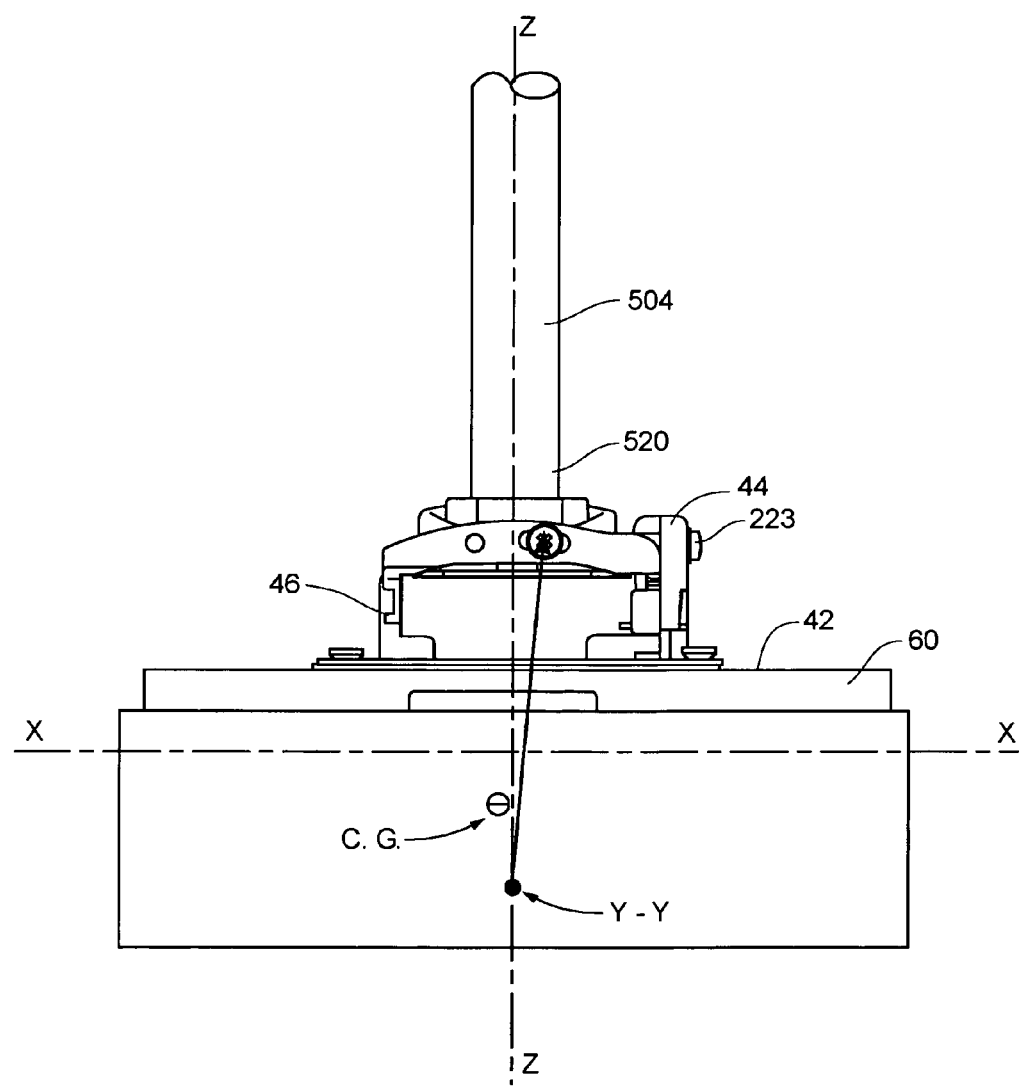
FIG. 28 is a front elevation view of a mount according to the invention coupling a device with a ceiling assembly, depicting the relationship of the device rotation axes with the center of gravity of the device.
Figure 29:
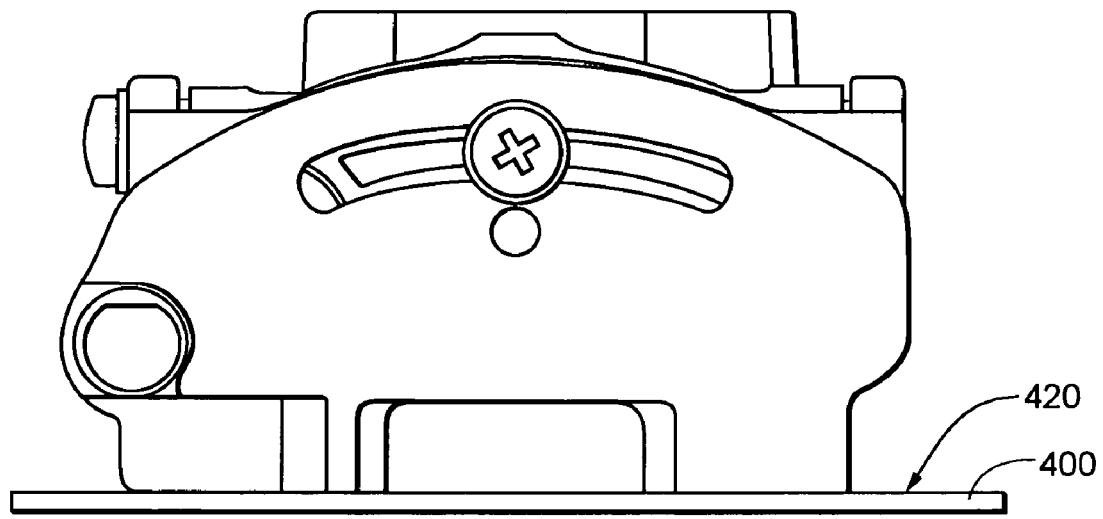
FIG. 29 is a side elevation view of an alternative embodiment of a mount according to the invention.
Figure 30:
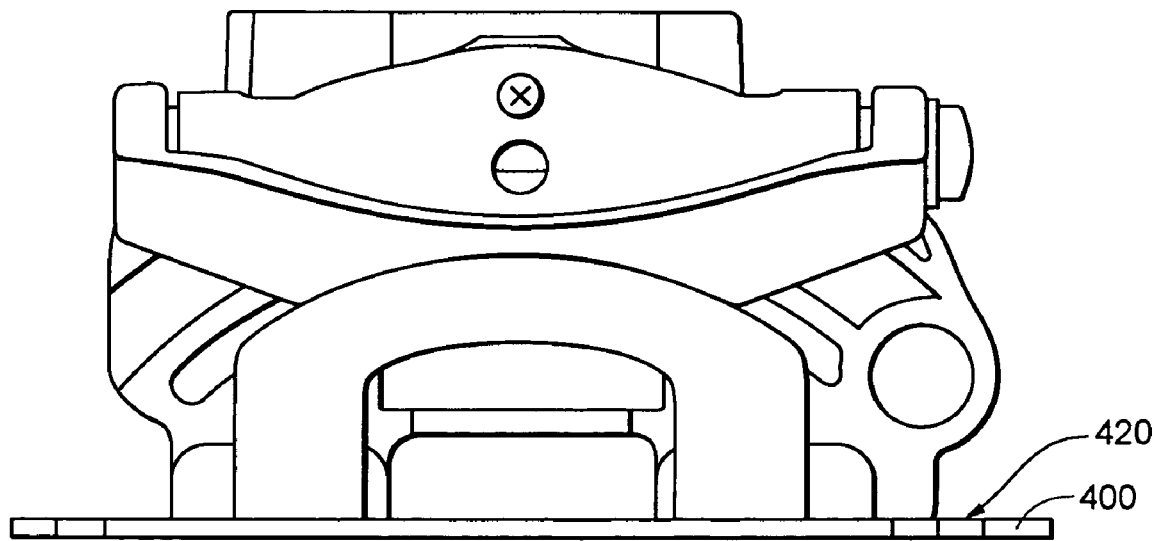
FIG. 30 is an opposing side elevation view of the mount depicted in FIG. 29.
Figure 31:
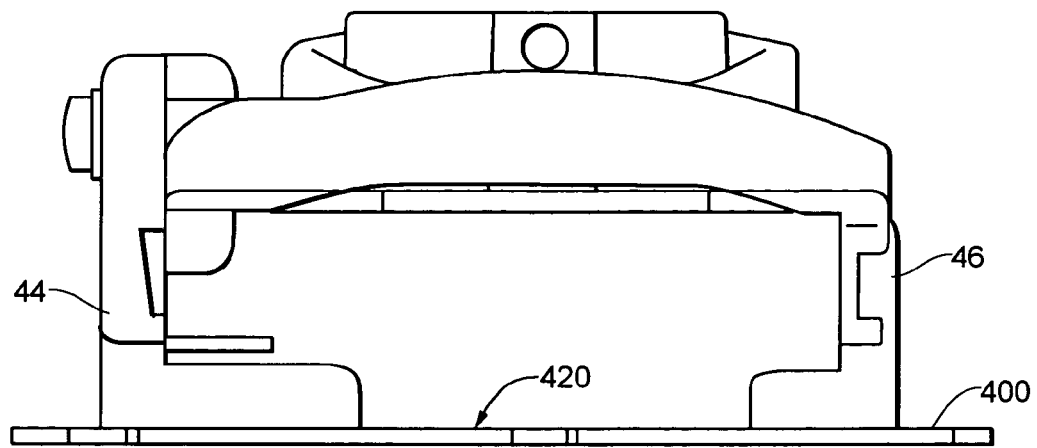
FIG. 31 is a rear elevation view of the mount depicted in FIG. 29.
Figure 32:
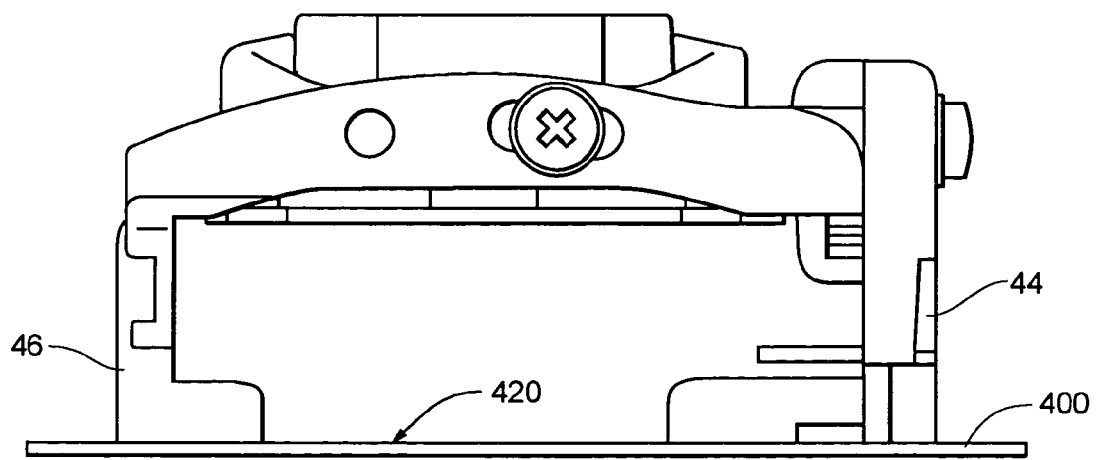
FIG. 32 is a front elevation view of the mount depicted in FIG. 29.
Figure 33:
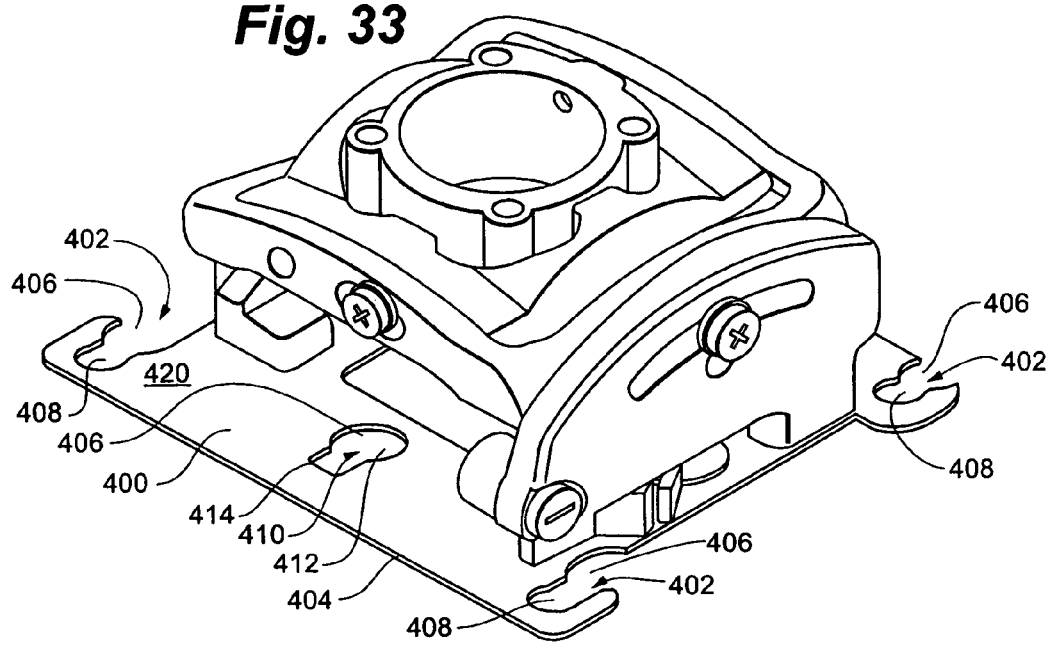
FIG. 33 is a perspective view of the mount depicted in FIG. 29.
Figure 34:
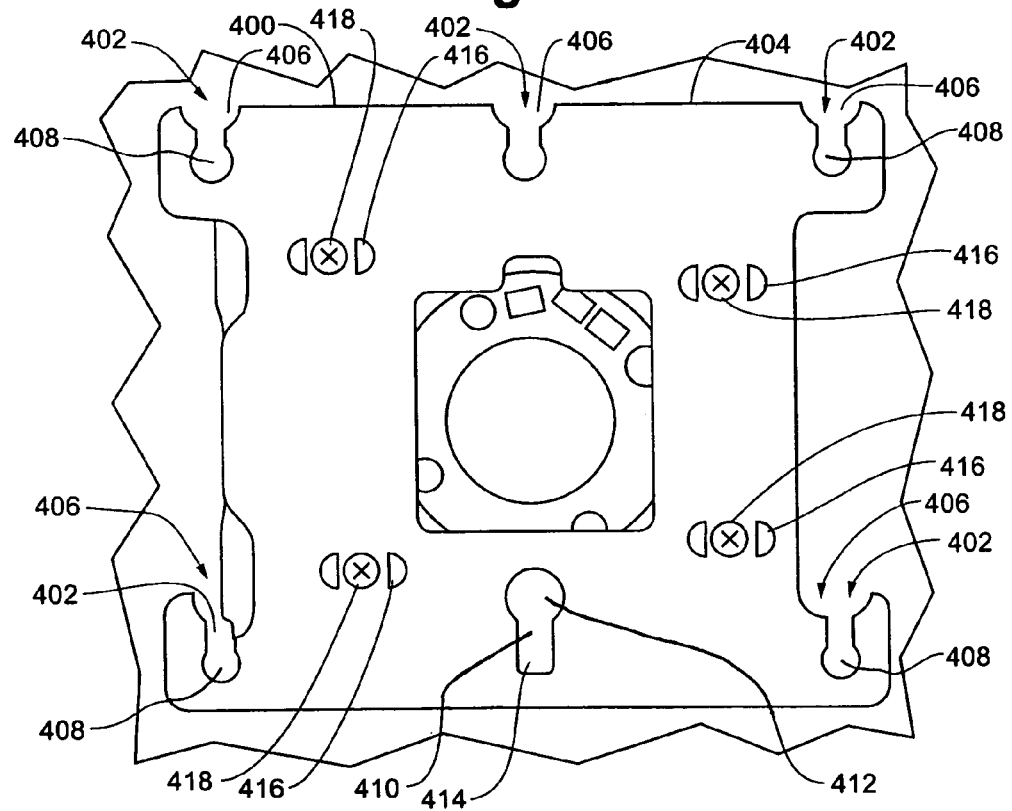
FIG. 34 is a bottom plan view of the mount depicted in FIG. 29.
Figure 35:
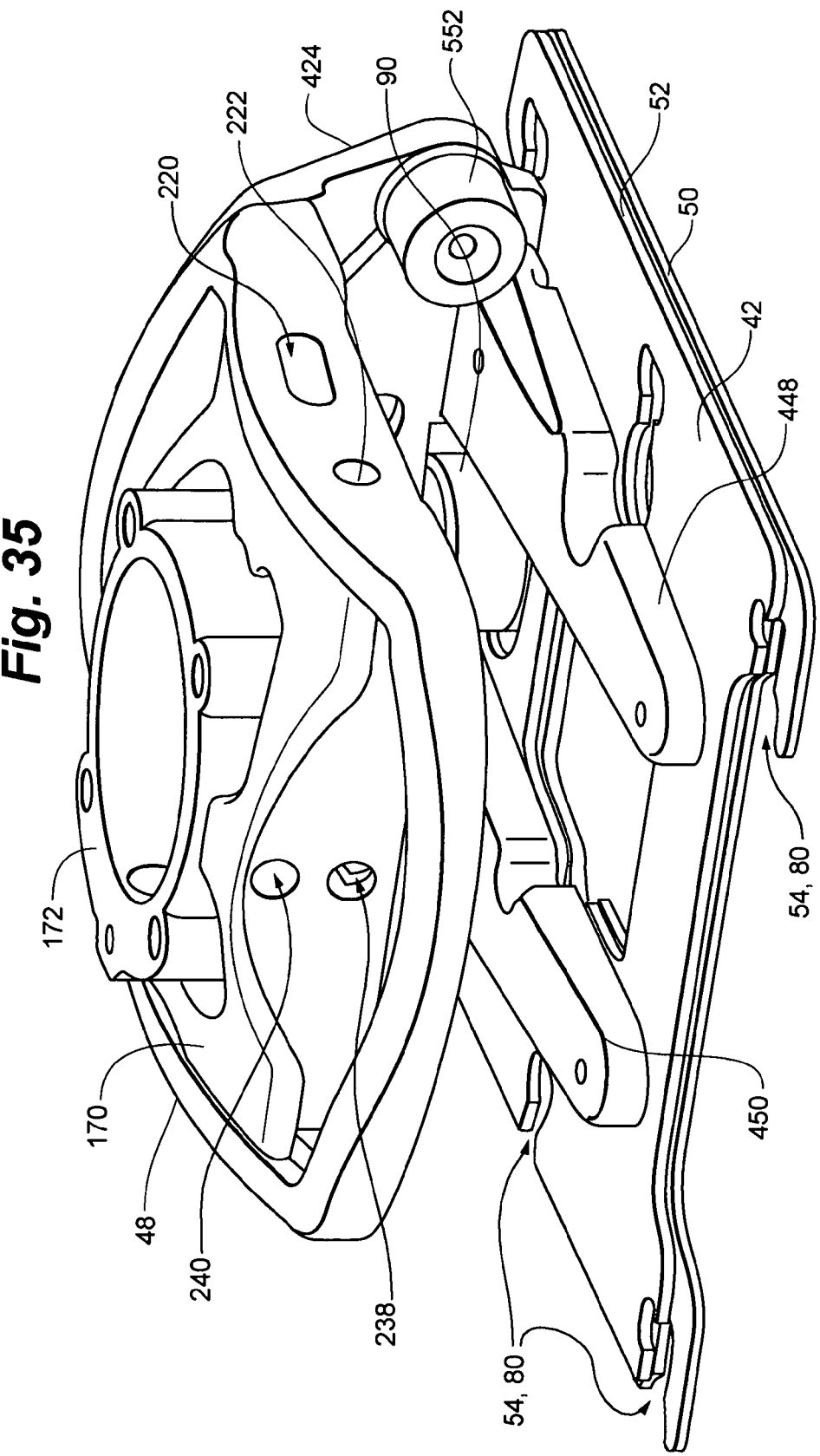
FIG. 35 is a perspective view of an alternative embodiment of a mount according to the invention.
Figure 36:
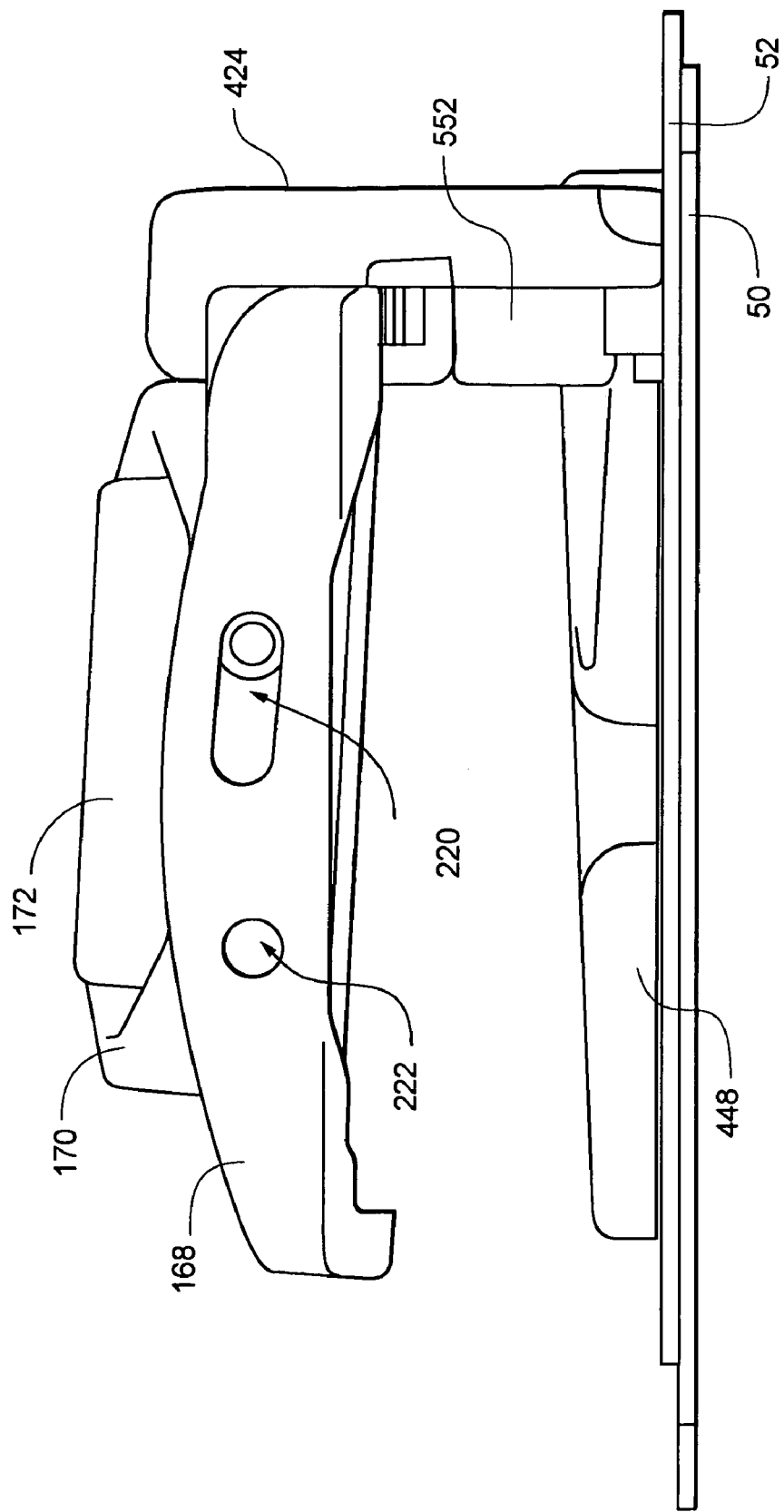
FIG. 36 is a front elevation view of the mount of FIG. 35.
Figure 37:
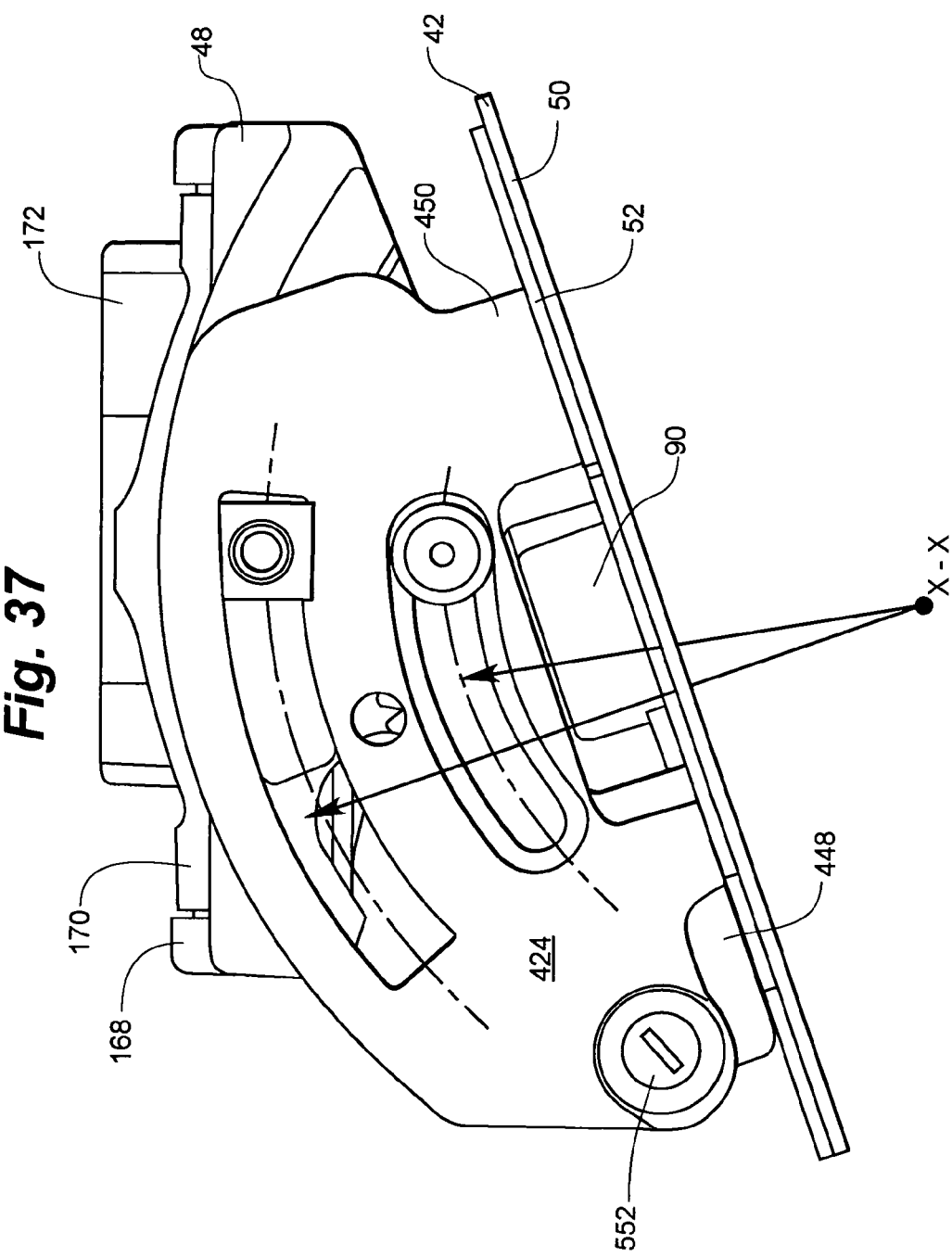
FIG. 37 is a side elevation view the mount of FIG. 35.
Figure 38:
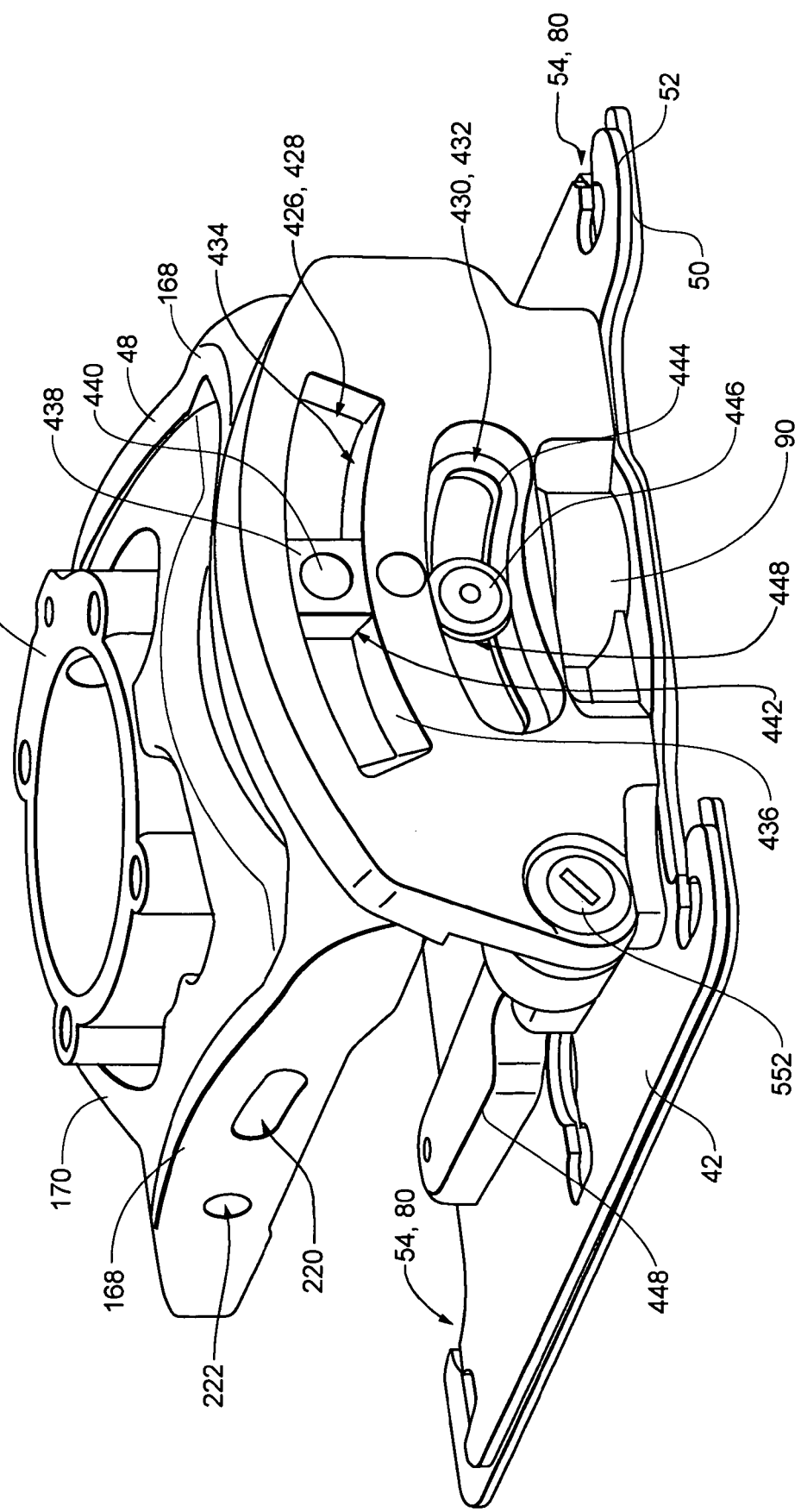
FIG. 38 is a perspective view of the mount of FIG. 35 viewed from an opposing angle.
Figure 39:
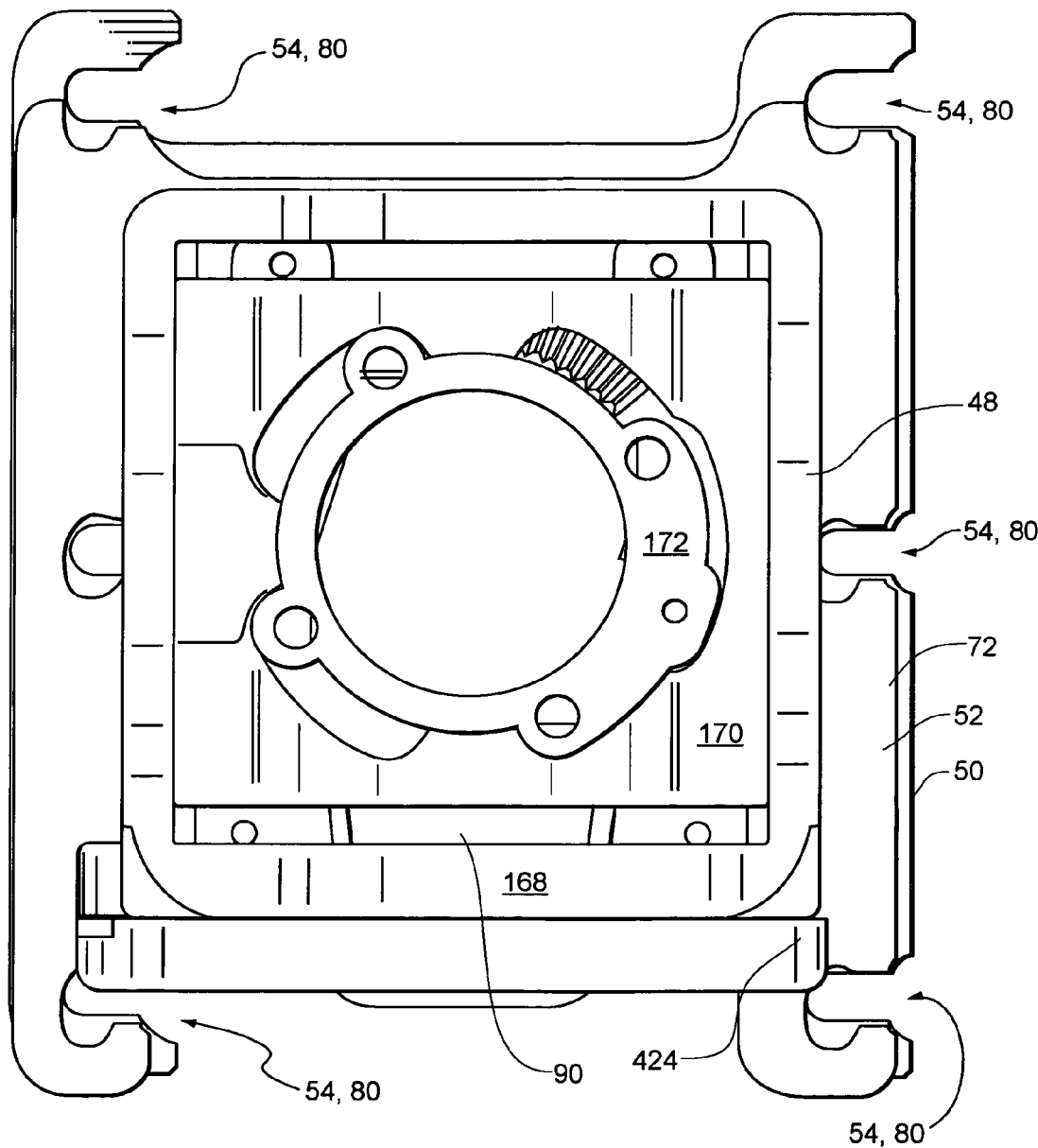
FIG. 39 is a top plan view of the mount of FIG. 35.
Figure 40:
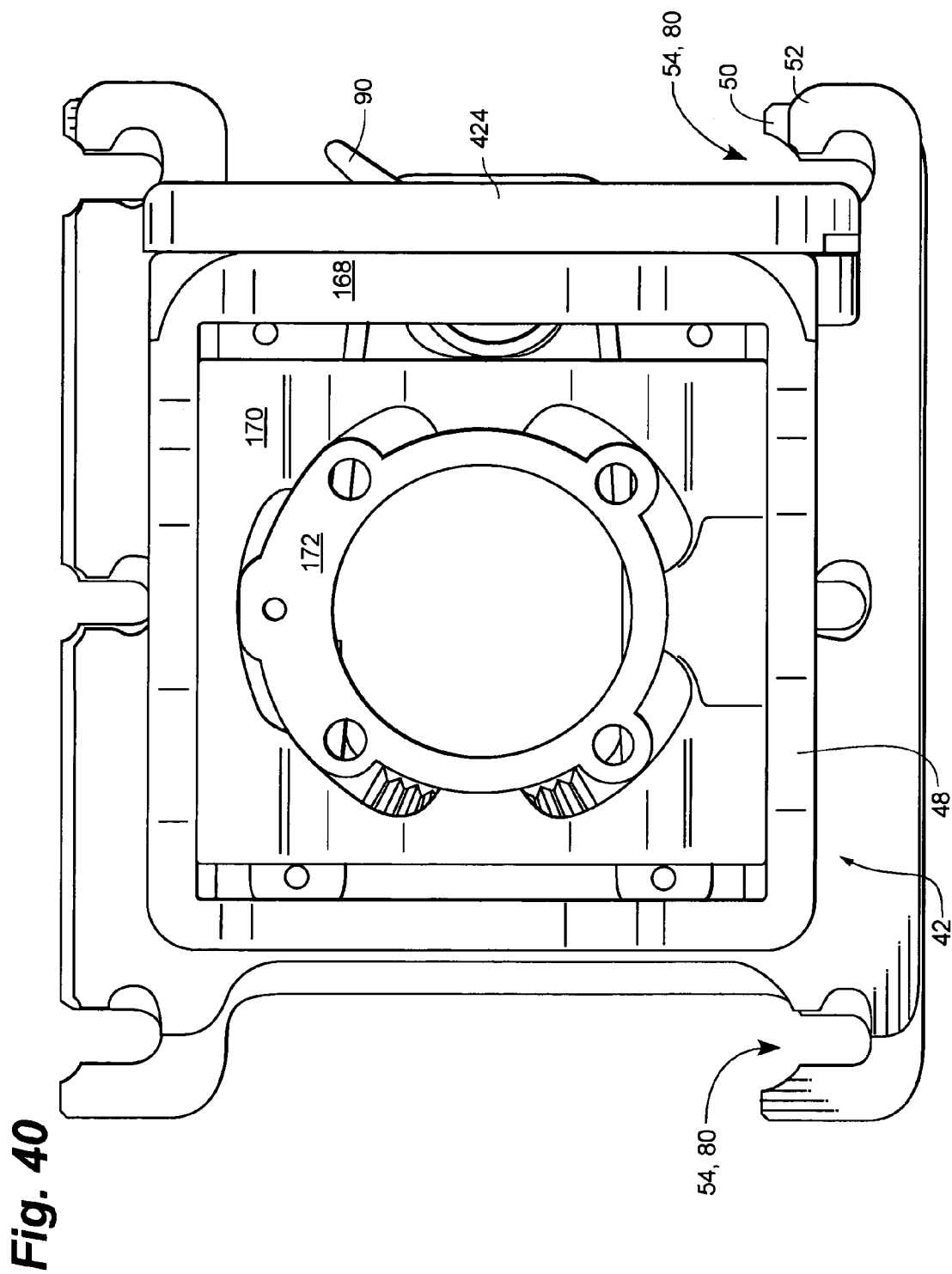
FIG. 40 is a top plan view of the mount of FIG. 35 with the base assembly depicted in an unlatched position.
Figure 41:
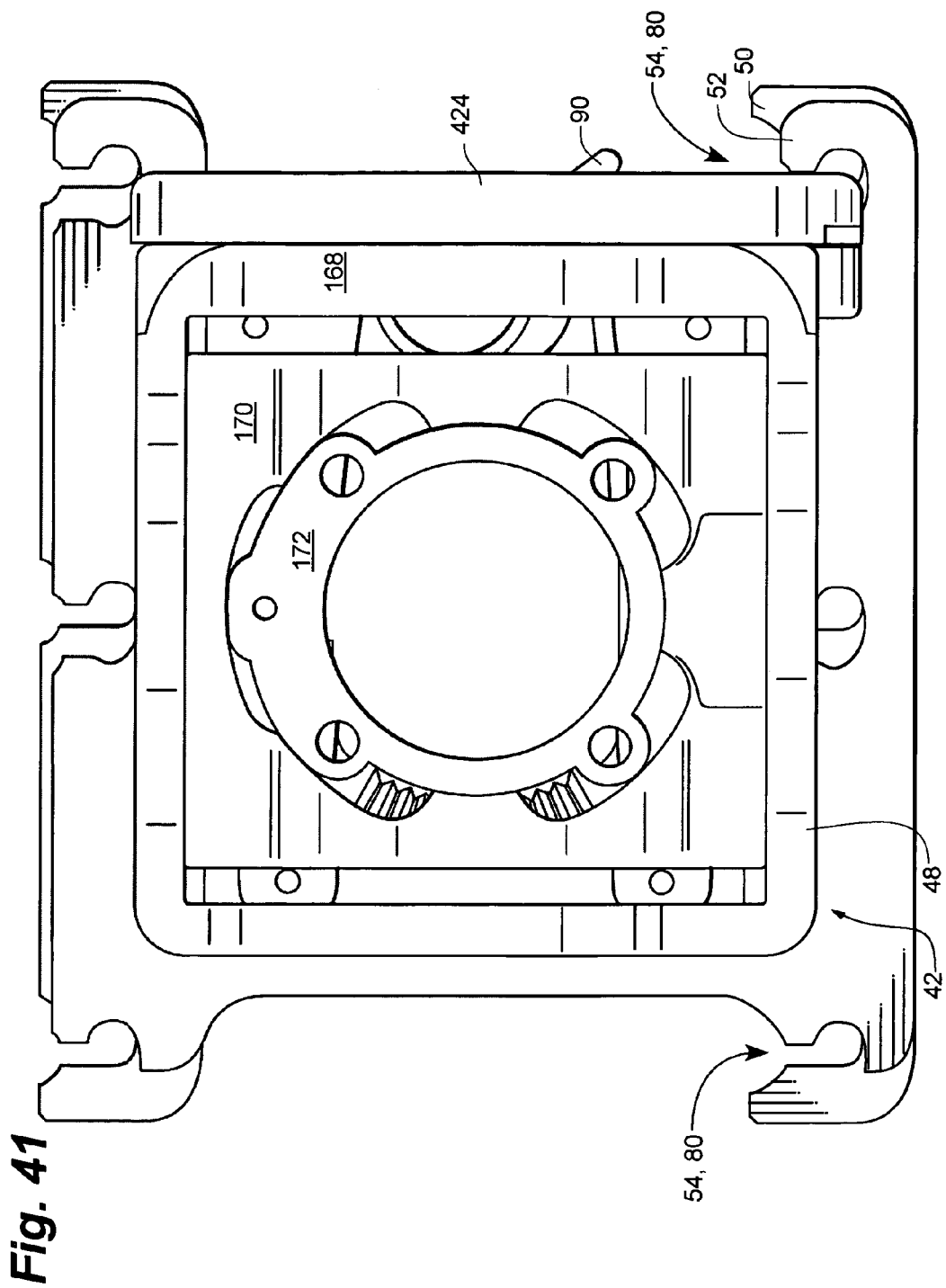
FIG. 41 is a top plan view of the mount of FIG. 35 with the base assembly depicted in a latched position.

As an alternative to a pipe suspension member, a plurality of suspension members 502 in the form of rod hangers 534 may be used to suspend mount 40 as depicted in FIGS. 25-27. Again, channels 508 are arranged spanning parallel structural members 510. Channels 508 have apertures 536 for receiving an end 538 of each rod hanger 534. The rod hangers 534 may be formed from threaded rod stock. Each rod hanger 534 is attached to the channel 508 with topside nut 540 and bottom side jam nut 542. The other end 544 of each rod hanger 534 passes through one of apertures 276 in yaw coupler 172. Bottom side nut 542 and topside jam nut 540 secure the rod hanger 534 within each aperture 276. It will of course be appreciated that tamper resistant spanner nuts, or any other type of tamper resistant nut, may be used for top side nut 540 or bottom side nut 542 to provide security and theft resistance to the connection.

With mount 40 secured to the ceiling assembly, device 62 may be attached. In an embodiment of the invention, interface plate 60 is attached to device 62 using suitable fasteners, which may be tamper resistant fasteners. Alternatively, fastening buttons 58 may be directly attached to device 62 in an arrangement corresponding to notches 54 and slot 76 in base plate 50. Preferably, each fastening button 58 has throat portion 546 and head portion 548 with tapered region 550 extending therebetween. Fastening button 58 may be secured to interface plate 60 or device 62 with fastener 552 which is threaded into bore 554 defined in fastening button 58 from below. Significantly, fastener 552 is accessible for loosening or removal only from below interface plate 60 or within device 62, and thus fastening button 58 cannot be loosened or removed as a means of unauthorized removal of the device 62 when device 62 is coupled to mount 40. Moreover, fastener 552 may be fixed to fastening button 58 by welding or an adhesive such as Loctite® to further inhibit loosening or removal.

In the embodiment depicted in FIGS. 1-28, lock lever 90 is moved to its unlatched position, wherein locking plate 52 is shifted so that notches 54 in base plate 50 are generally aligned with notches 80 in locking plate 52. Base plate 50 is then positioned with enlarged outer region 64 of each notch 54 adjacent one of the fastening buttons 58 and with a corresponding fastening button 58 extending through enlarged portion 74 of slot 76. Mount 40 may be manually shifted from this position so that the throat portion 546 of each fastening button 58 is received in an inner channel region 68 of a notch 54 or in channel portion 72 of slot 76. Head portion 548 is larger than channel region 68 and channel portion 72 thereby preventing base plate 50 from being pulled axially relative to fastening buttons 58.

Lock lever 90 is then moved to the latched position, shifting locking plate 52 so that the edge of notches 80 contact fastening buttons 58. Tapered region 550 directs the contact of locking plate 52 downwardly toward throat portion 546 of the fastening buttons. Preferably, throat portion 546 of each fastening button 58 is dimensioned so that its length is equal to or slightly less than the combined thicknesses of base plate 50 and locking plate 52. As locking plate 52 contacts tapered region 550 when lock lever 90 is latched, the edge of each notch 80 slides downwardly along it, forcing base plate 50 and locking plate 52 together. Once locking plate 52 reaches its final position, locking plate 52 and base plate 50 are tightly clamped between interface plate 60 or device 62 and head portion 548, and fastening buttons 58 are secured within notches 54 and corresponding notches 80 to prevent base assembly 42 from being shifted relative to interface plate 60 and/or device 62. Positioning of device 62 relative to mount 40 is generally very accurate due to the lack of free play in the interface of base assembly 42 with fastening buttons 58. Moreover, the positioning accuracy is generally maintained, even when mount 40 detached from device 62 and subsequently reattached. Further, device 62 may be quickly and easily attached and detached from mount 40 simply by shifting lock lever 90 and engaging or disengaging the device interface with device 62.

Figure 20:
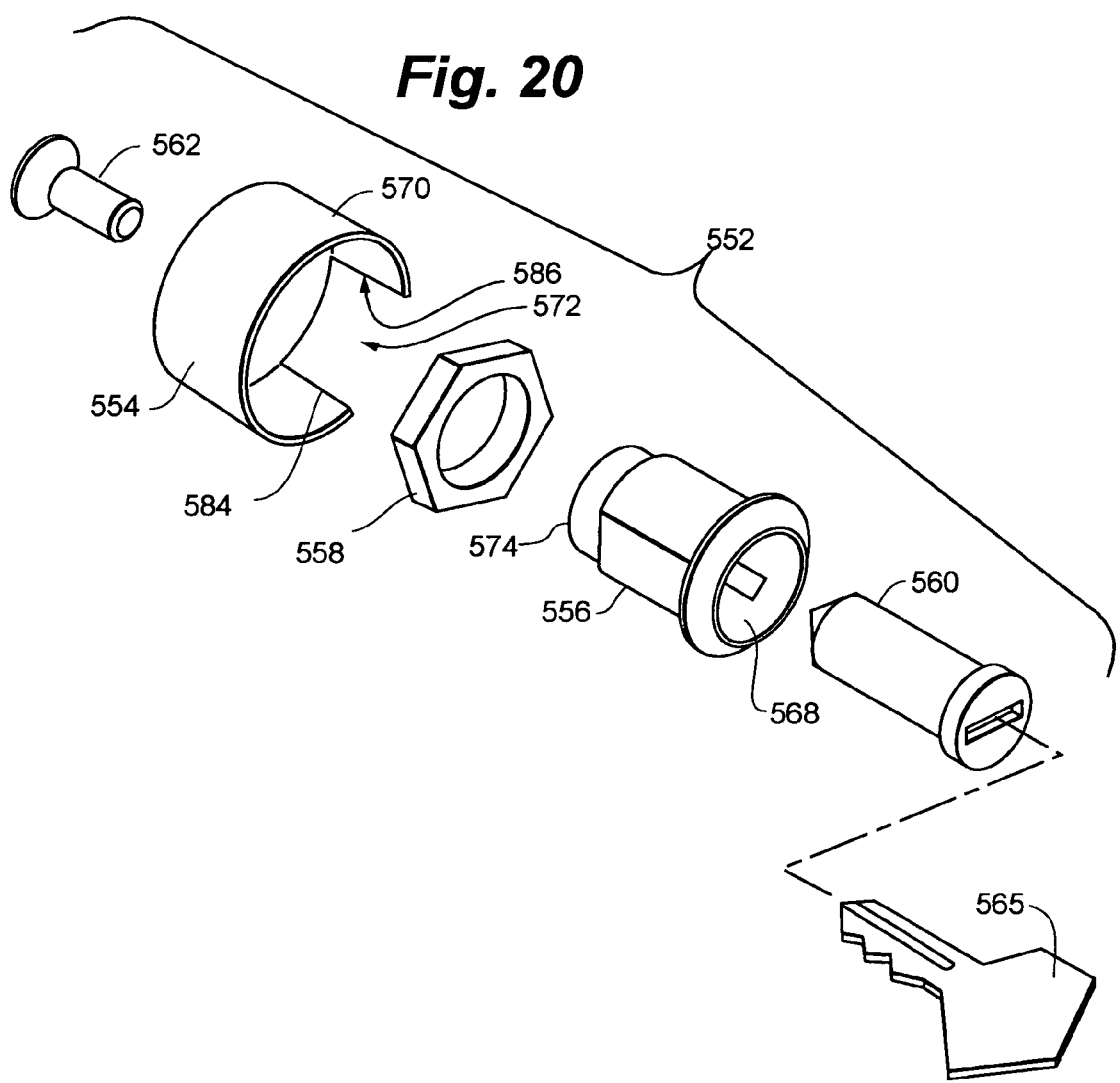
FIG. 20 is an exploded perspective view of the key lock assembly of a mount according to an embodiment of the invention.
Figure 21:
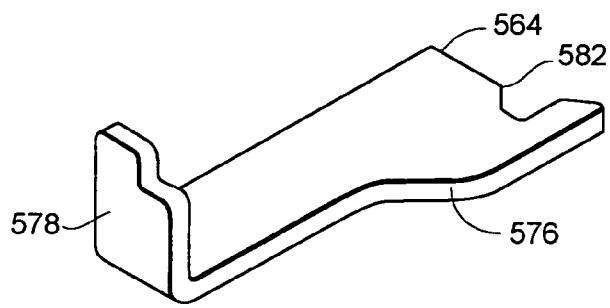
FIG. 21 is a perspective view of the latch bolt of a mount according to an embodiment of the invention.
Figure 22:
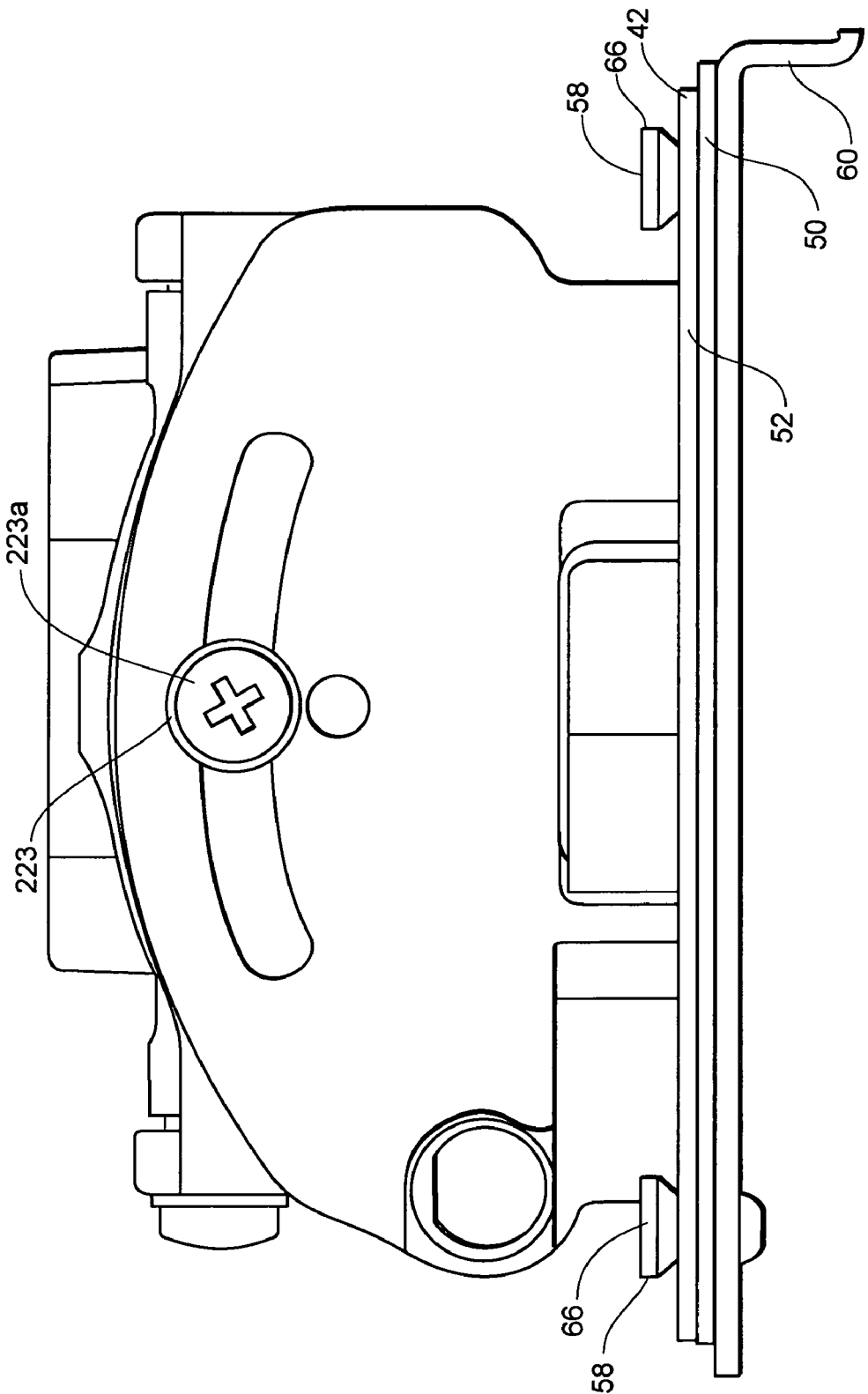
FIG. 22 is a side elevation view of a mount according to an embodiment of the invention with the guide assembly depicted in phantom.
Figure 23:
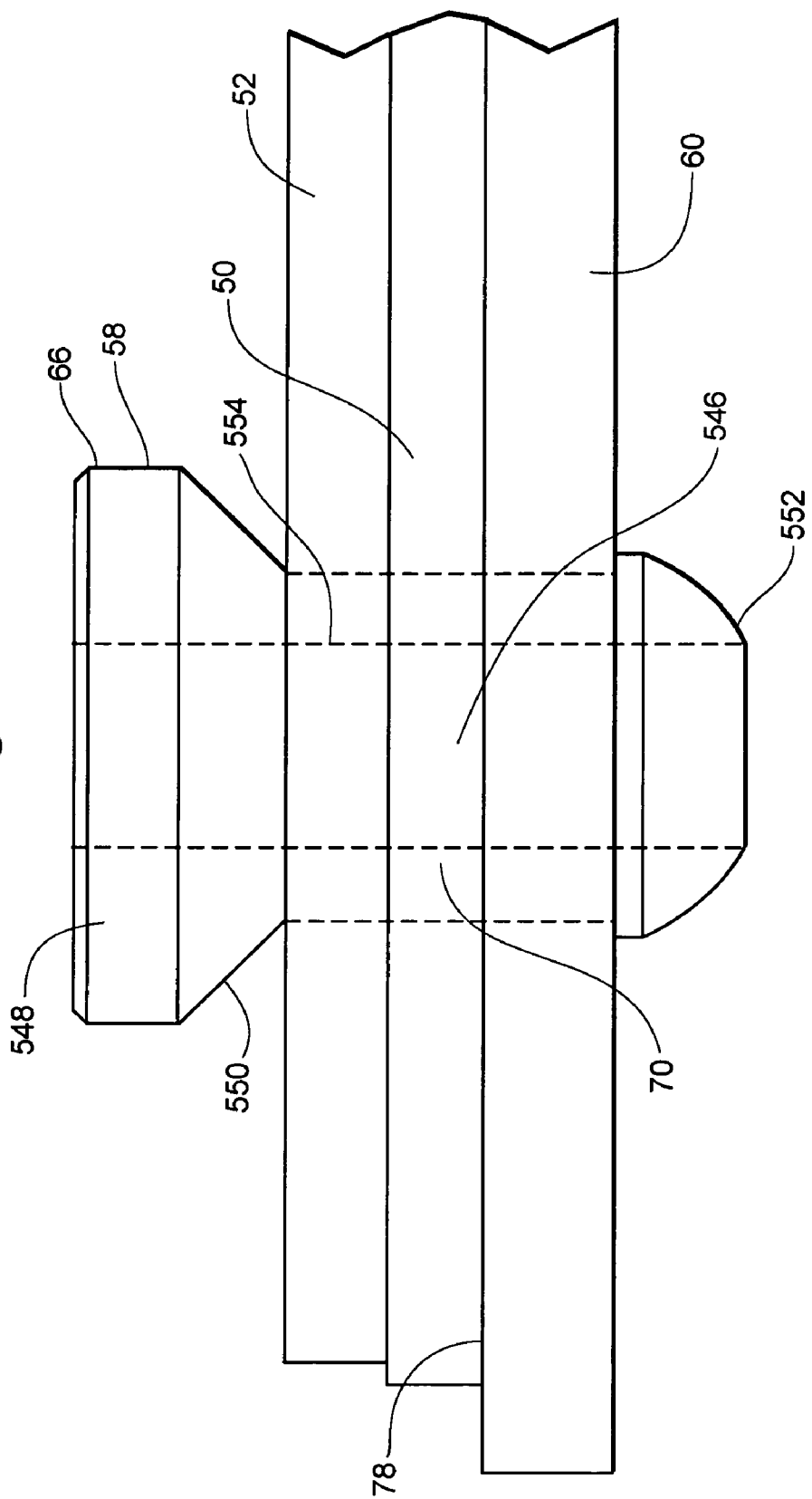
FIG. 23 is a fragmentary side elevation view of the interface of the base assembly of a mount according to an embodiment of the invention with a fastening button, with the base assembly components depicted in phantom.

In embodiments of the invention, mount 40 may be equipped with key lock assembly 552 for locking lock lever 90 in the latched position. As depicted in FIGS. 20-21, key lock assembly 552 generally includes lock barrel 554, housing 556, housing nut 558, lock cylinder 560, barrel fastener 562, lock slide 564, and a key 565 corresponding with and adapted to operate lock cylinder 560. Housing 556 is received through lock aperture 566 defined in guide assembly 44 with open end 568 facing outwardly, and is secured in place with housing nut 558 bearing on inner side 146 of guide assembly 44. Lock barrel 554 has side wall 570 defining opening 572 and is secured to operable portion 574 of housing 556 with barrel fastener 562. Lock cylinder 560 is received in open end 568 of housing 556 and is operably coupled with operable portion 574 so that when lock cylinder 560 is actuated with a key 565, lock barrel 554 is rotated therewith. Lock slide 564 is generally L-shaped with a bolt portion 576 and a catch portion 578 extending generally perpendicularly therefrom. Lock slide 564 is received in recess 580 defined in bottom surface 127 of leg 116 so that lock slide 564 is slidably disposed between guide assembly 44 and locking plate 52. Distal end 582 of bolt portion 576 is positioned proximate lock lever 90, while catch portion 578 extends upwardly and is received in opening 572 of lock barrel 554.

In operation, with lock lever 90 in the latched position, the key 565 may be rotated to rotate lock barrel 554 in a counter-clockwise direction when viewed from the side of guide assembly 44, thereby causing trailing edge 584 of opening 572 to push lock slide 554 so that distal end 582 is in contact with lock lever 90. In this position, lock slide 554 prevents rotation of lock lever 90 thereby preventing it from being moved to the unlatched position. The key 565 may be removed to secure the assembly in this position. In addition, as a security feature, handle 94 of lock lever 90 may be made so as to break off if undue force is used in an attempt to overcome the lock mechanism, thus providing additional security to the installation.

When it is desired to remove device 62 from mount 40, the key 565 may be inserted in lock cylinder 560 and rotated to rotate lock barrel 554 clockwise, causing leading edge 586 of opening 572 to pull lock slide 554 so that distal end 582 is pulled away from lock lever 90, enabling it to be rotated to the unlatched position.

When it is desired to remove device 62 from mount 40, the key may be inserted in lock cylinder 560 and rotated to rotate lock barrel 554 clockwise, causing leading edge 586 of opening 572 to pull lock slide 554 so that distal end 582 is pulled away from lock lever 90, enabling it to be rotated to the unlatched position.

Significantly, all fasteners that must be removed for disassembly or removal of the mount 40, namely 124, 290, and 326, are accessable for removal only from below the mount in the direction of the device 62, once it is attached. Hence, mount 40 is resistant to unauthorized attempts to remove device 62 by disassembly or removal of the mount 40. Coupled with the locking feature disclosed above, mount 40 is thus resistant to theft.

Once device 62 is attached to mount 40, the mount pitch, roll, and yaw adjustments may be manipulated to precisely aim the device 62 as desired. For instance, where device 62 is a projector, the light beam of the projector may be precisely aimed using the mount adjustments so that it covers a screen without overlap or unused screen portions. Also, the automatic re-registration provided by the interface of device interface 42 with fastening buttons 58 ensures that these adjustments will be maintained even if the projector is dismounted from mount 40 and remounted using the quick release device interface 42 described above.

Device mount 40 enables pitch adjustment of device 62 by sliding movement of guide assemblies 44, 46, relative to outer frame 168, roll adjustment of device 62 by sliding movement of inner frame 170 relative to outer frame 168, and yaw adjustment of device 62 by rotational sliding movement of yaw coupler 172 within inner frame 170. In embodiments of the invention, each of the pitch, roll, and yaw adjustments of device mount 40 has a single friction member for applying a selective amount of friction resisting adjustment or to fix the adjustment at a particular desired position. Friction screw 223 with friction washer 223a enables a selective amount of frictional resistance to be applied for resisting pitch adjustment, friction screw 269c and friction washer 269d enables a selective amount of frictional resistance to be applied for resisting roll adjustment, and set screw 332 enables fixing of yaw coupler 172 in a desired device yaw position. The single friction member for fixing each adjustment enables quick and easy adjustments in that only one fastener need be loosened and tightened in order to make the desired adjustment.

For coarse adjustment, it is only necessary to loosen the appropriate friction screw enough to enable relative movement of the components, position the projector or device as desired, and retighten the friction screw to fix the adjustment in place. For example, to adjust the projector for pitch, friction screw 223 is loosened by a sufficient amount to enable movement between guide assemblies 44, 46, and outer frame 168. The projector is then positioned at the desired pitch, and friction screw 223 is retightened. The coarse adjustment of roll and yaw proceeds in identical fashion by manipulating friction screw 269c and set screw 332 respectively.

In embodiments of the invention, fine tuning capability for pitch, roll, and yaw adjustment of device mount 40 are provided by a row gear teeth formed in a rack arrangement on the various components. Preferably, the gear teeth are cut so as to mesh with a drive element in the form of the tip of a standard Phillips screwdriver, having for example, a standard number two Phillips tip. In these embodiments, the Phillips screwdriver serves as a pinion meshing with the rack formed on a component to provide a means of translating the component. With accurate tooth cuts providing relatively close tolerances between the screwdriver tip blades and the gear teeth, and coupled with the inherent mechanical advantage provided by the gear arrangement itself, very small and precise adjustments are possible.

Figure 10A:
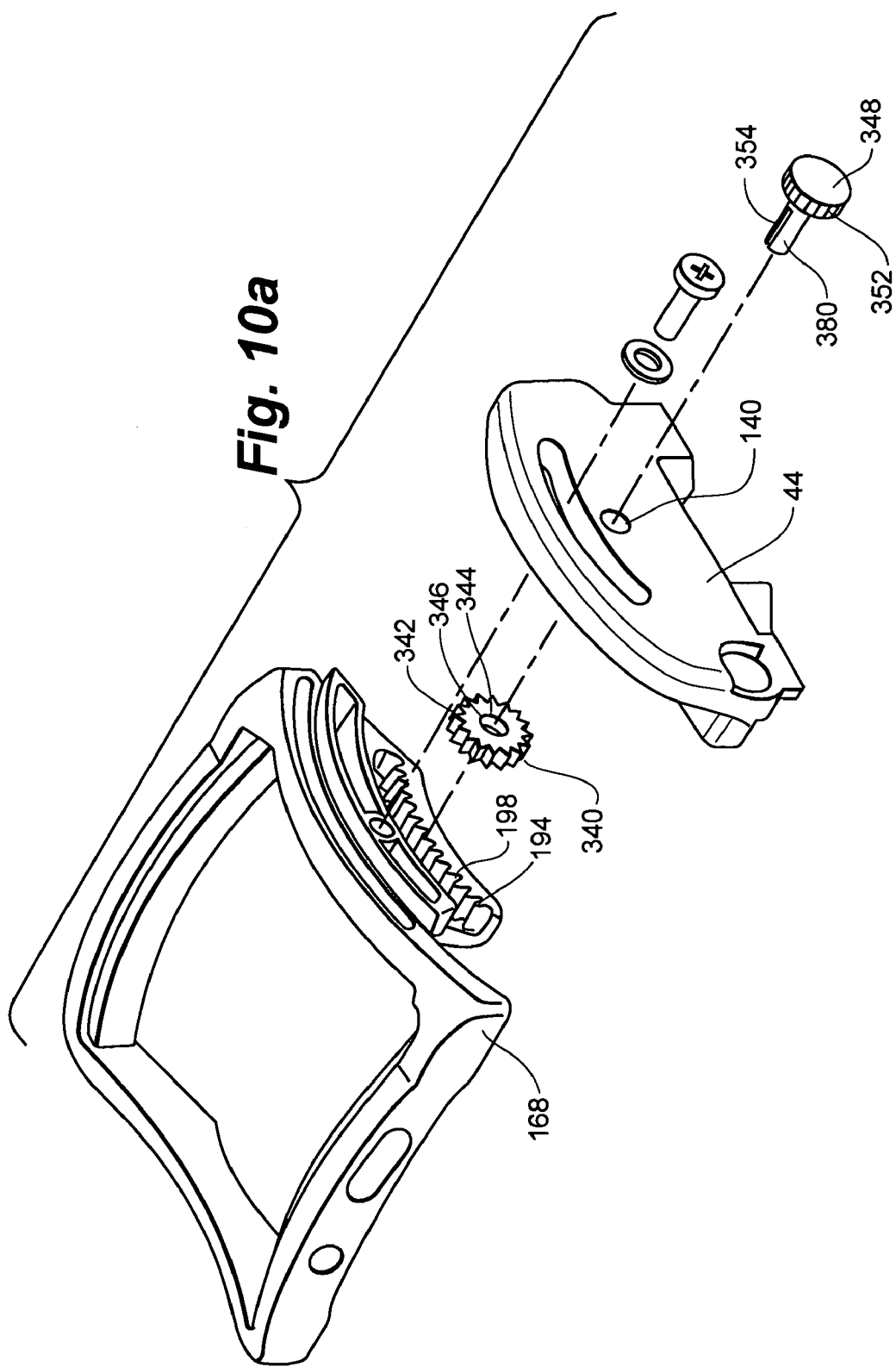
FIG. 10a is a fragmentary exploded perspective view of the guide structure and outer frame of a mount according to an embodiment of the invention, the mount having an integral gear adjustment assembly.
Figure 12:
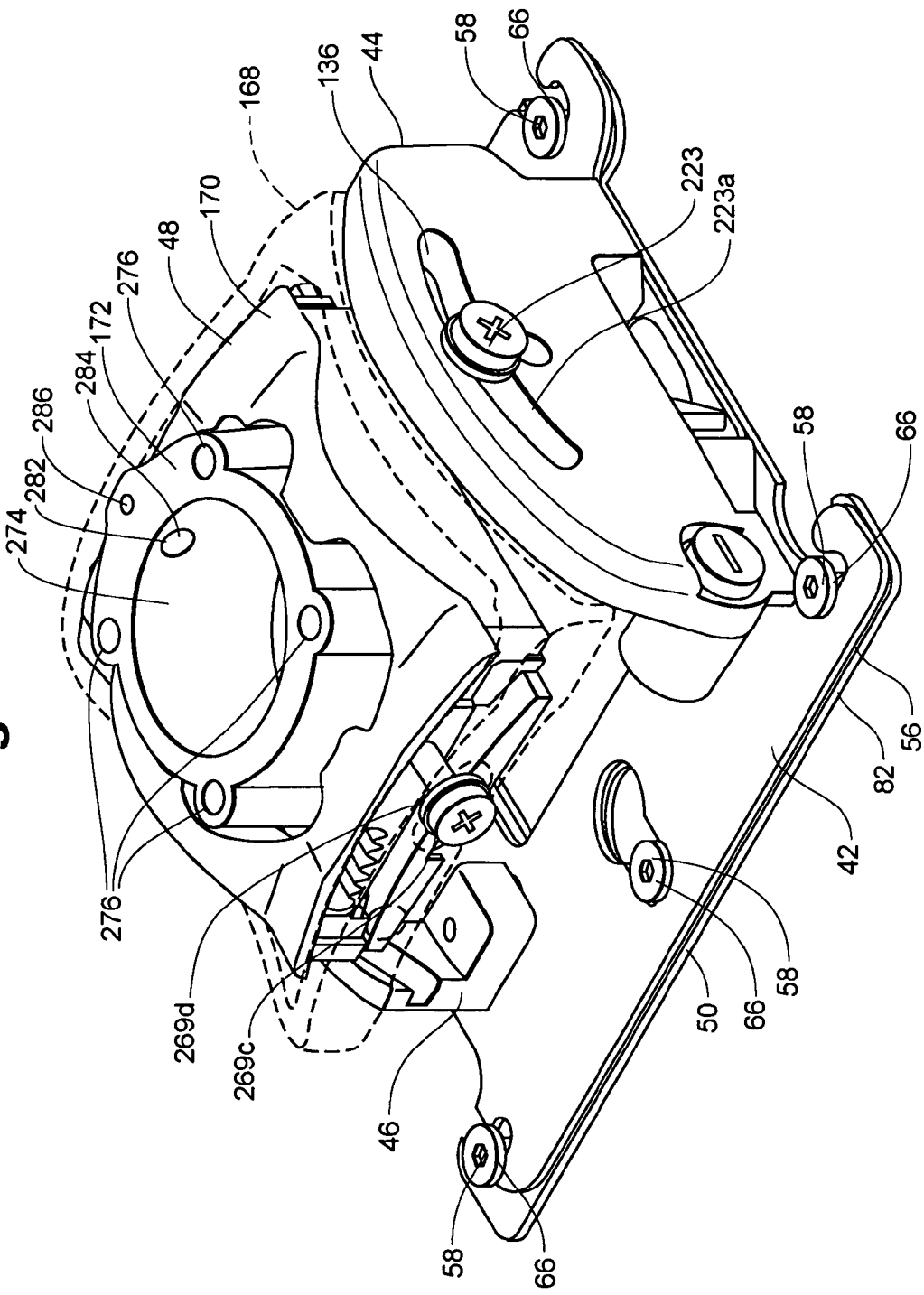
FIG. 12 is a perspective view of the mount of FIG. 4 with the outer frame of the support structure interface shown in phantom to reveal the inner frame.
Figure 14A:
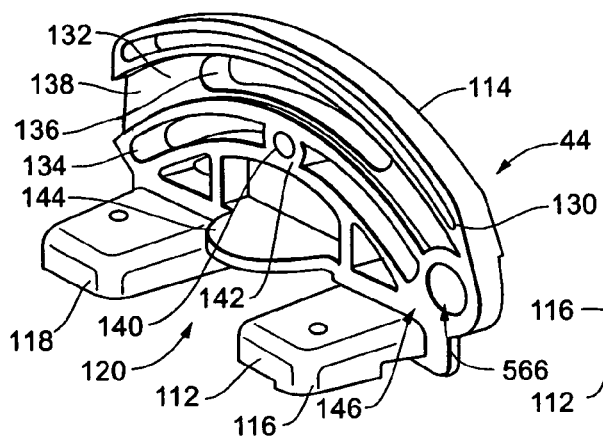
FIG. 14a is a rear perspective view of another of the guide assemblies of a mount according to an embodiment of the invention.
Figure 14B:
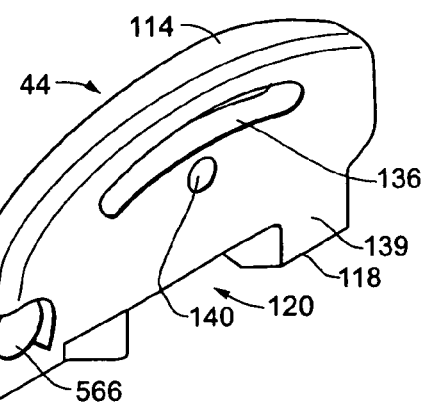
Figure 14C:
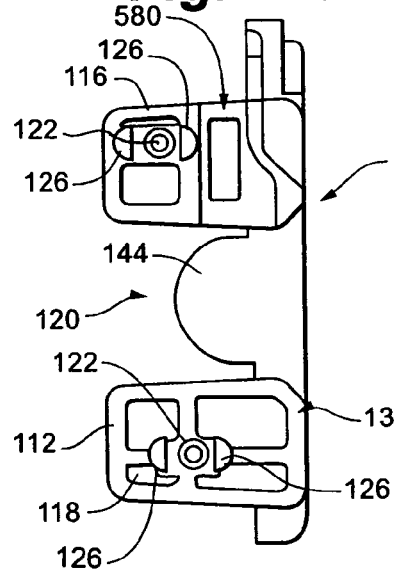
Figure 14D:
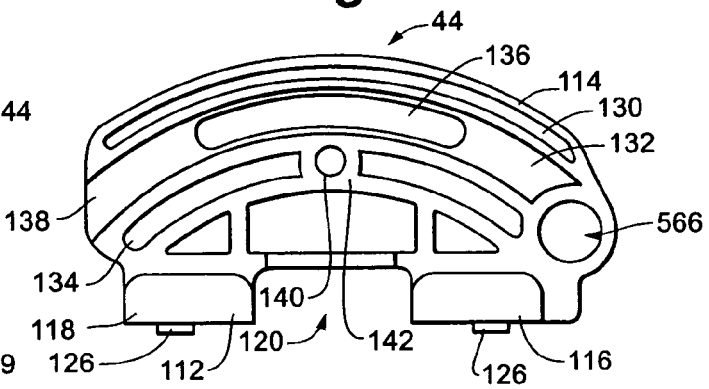
Figure 14E:
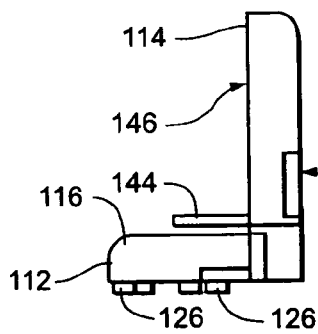
Figure 14F:
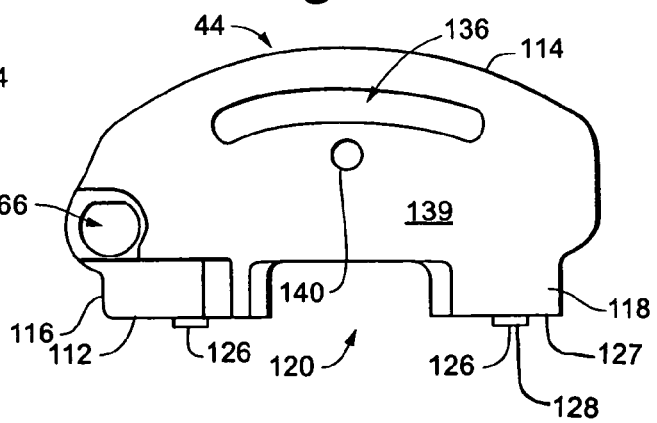
Figure 15A:
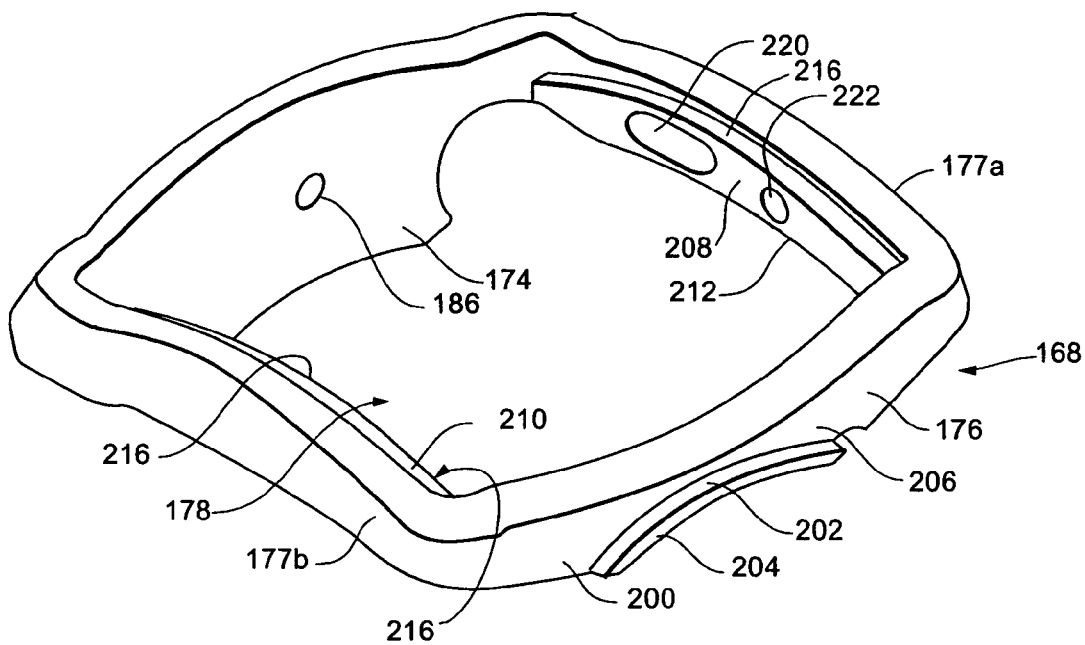
FIG. 15a is a perspective view of the outer frame of the support structure interface of a mount according to an embodiment of the invention.
Figure 15B:
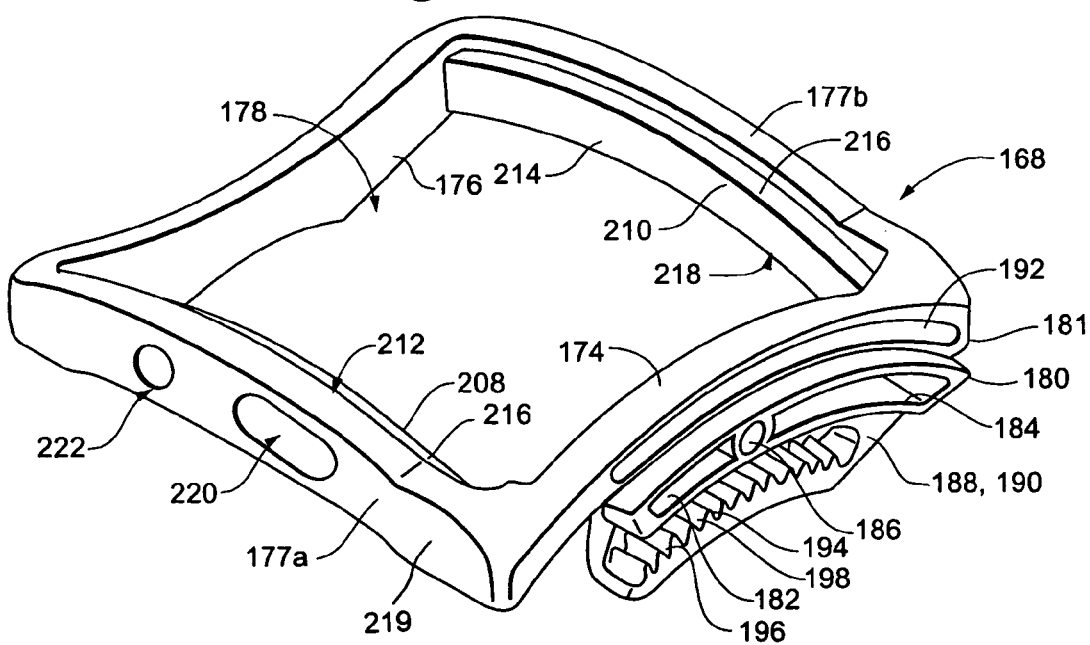
Figure 15C:
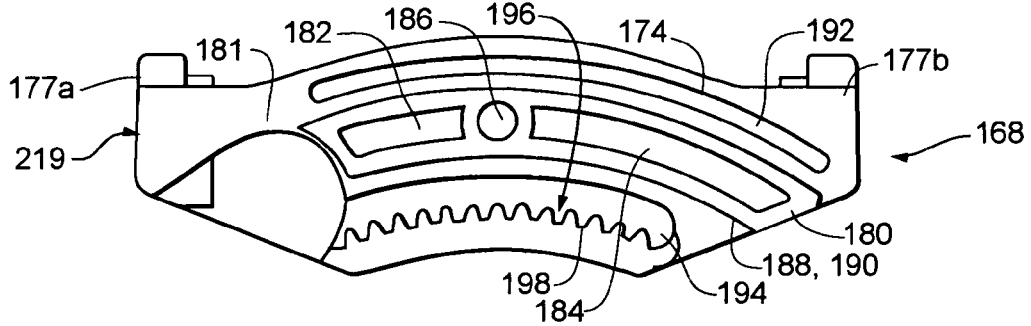
Figure 15E:
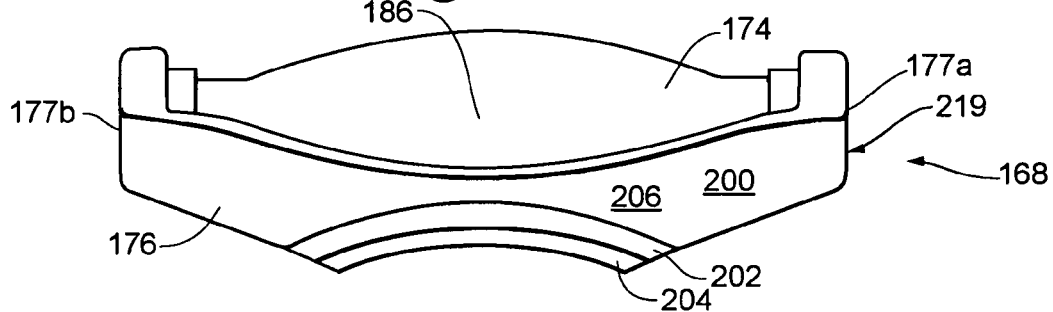
Figure 15F:
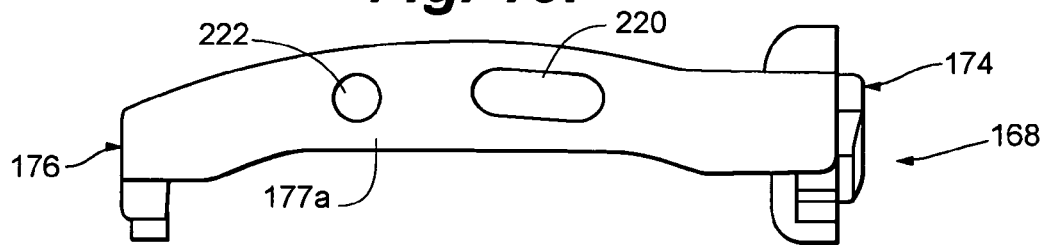
Figure 15D:
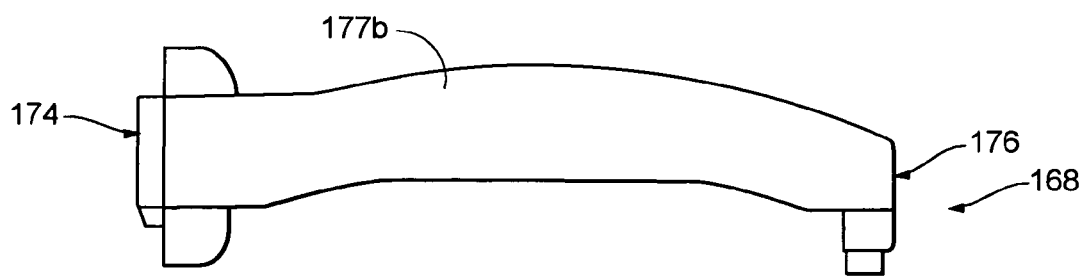
Figure 16A:
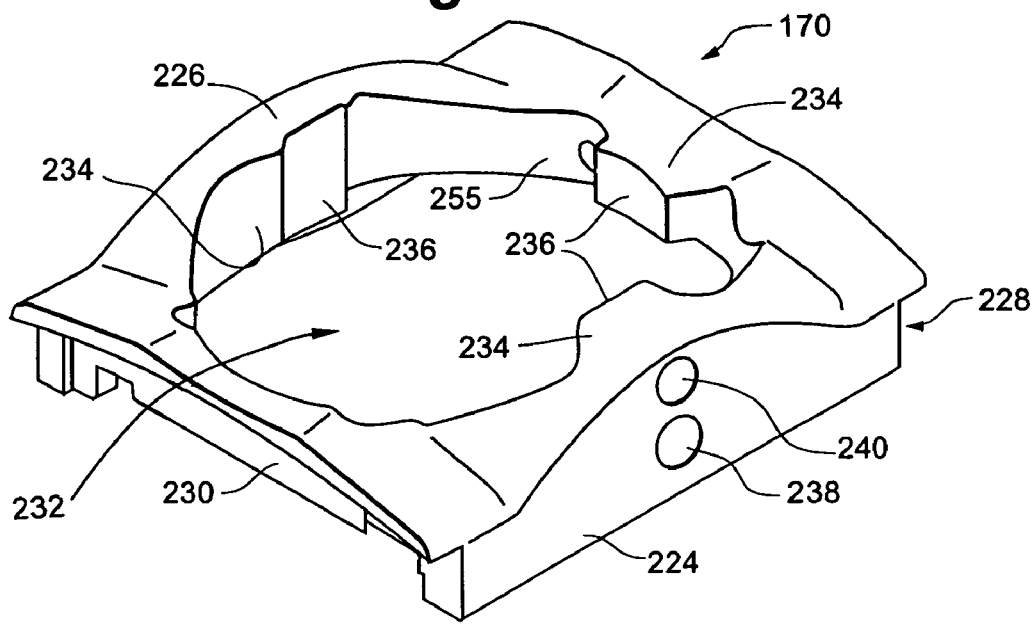
FIG. 16a is a perspective view of the inner frame of the support structure interface of a mount according to an embodiment of the invention.
Figure 16B:
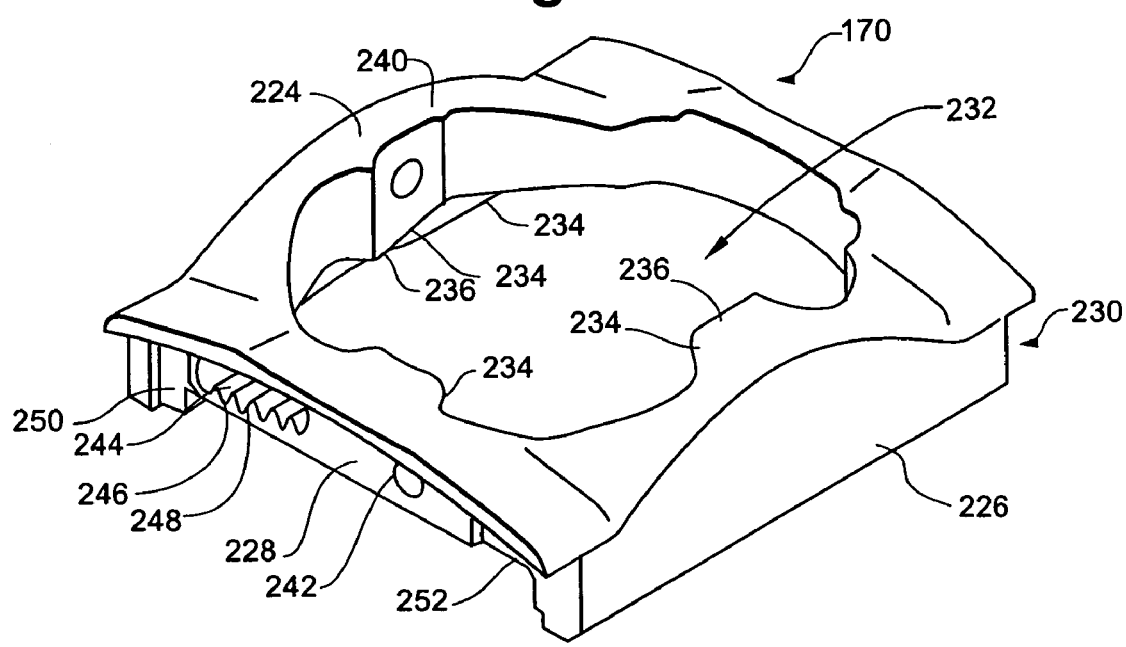
Figure 16C:
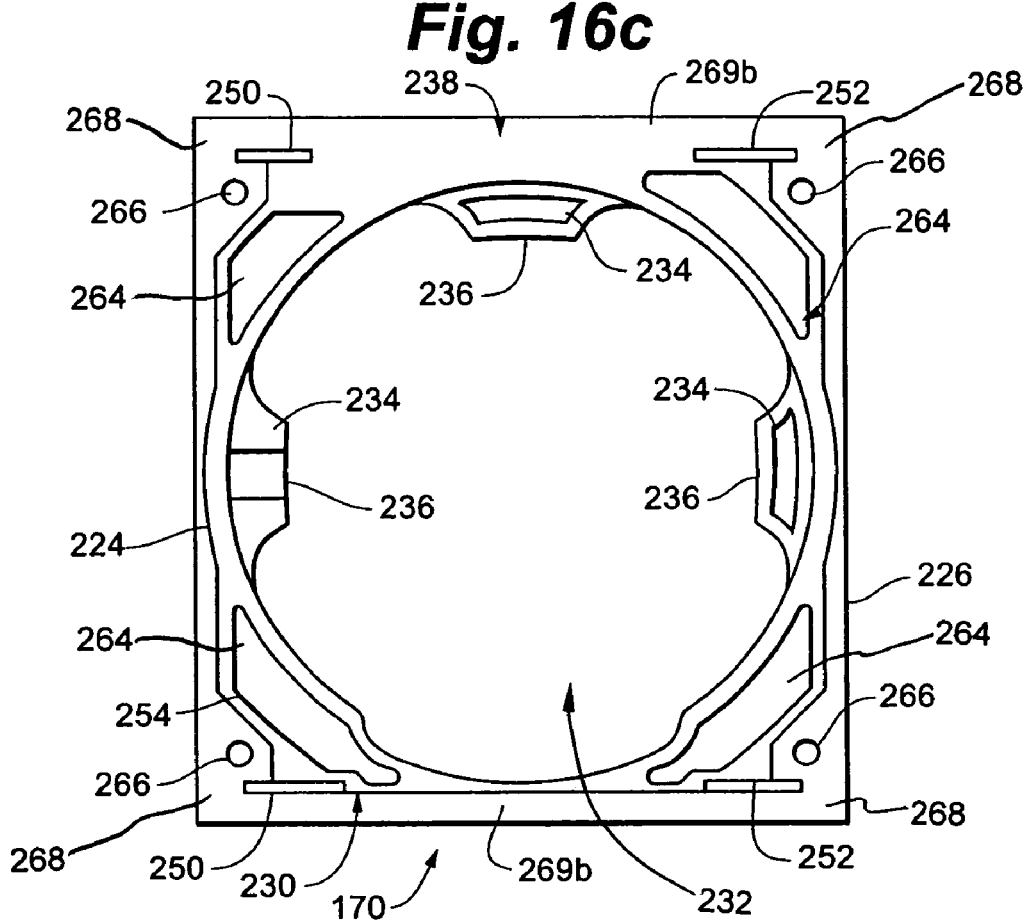
Figure 16D:
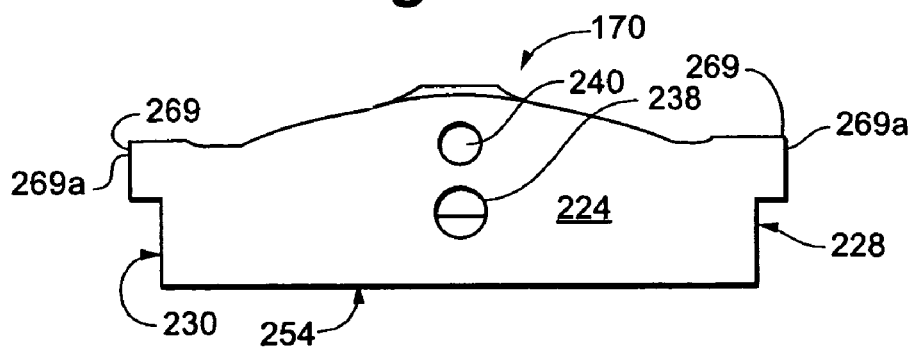
Figure 16E:
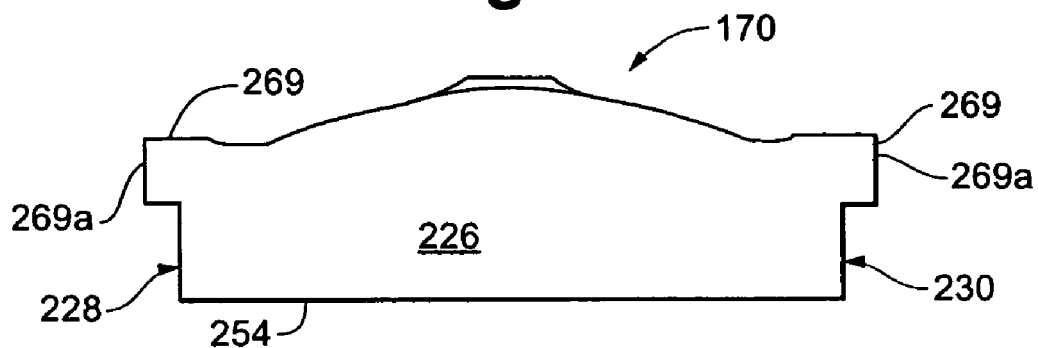
Figure 16F:
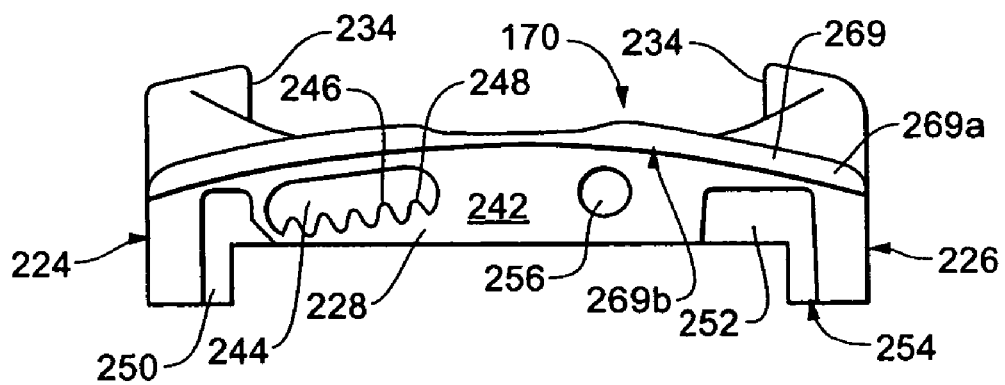
Figure 16G:
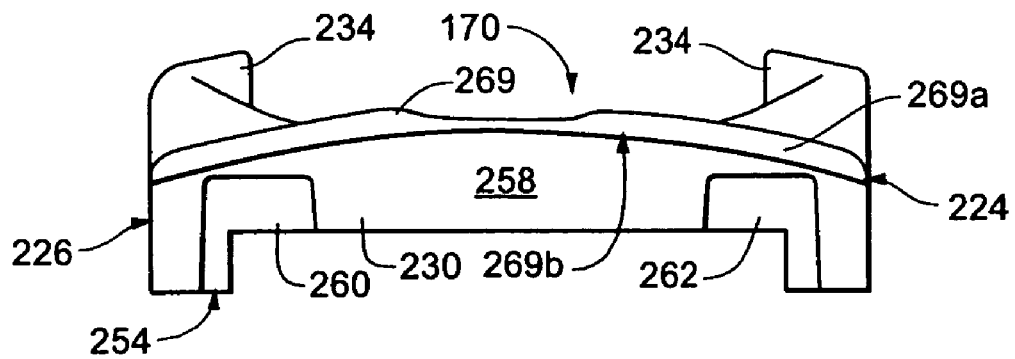
Figure 17A:
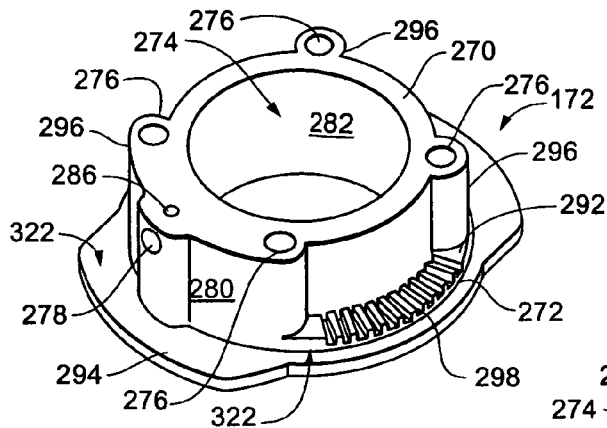
FIG. 17a is a perspective view of the yaw coupler of the support structure interface of a mount according to an embodiment of the invention.
Figure 17B:
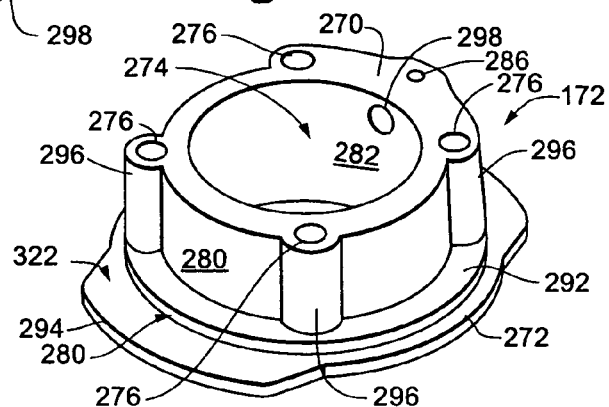
Figure 17C:
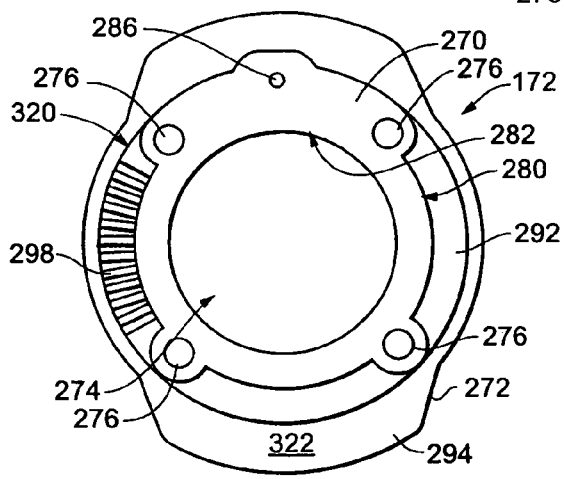
Figure 17D:
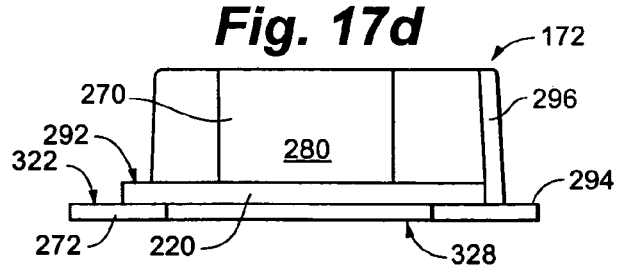

It will be appreciated that the drive element may take a variety of other forms within the scope of the present invention. For example, the gear teeth may be cut so as to mesh with other fastener drive tools such as a star or Torx® tip, or even a straight blade screwdriver tip. Moreover, where it is desired to integrate the drive element with the mount, a conventional gear having involute teeth may be meshed with a rack structure as described above that cut for such involute teeth such as depicted in FIG. 10a. In such embodiment, gear 340 is received in channel 194 of guide assembly 44 and has teeth 342 meshed with gear teeth 198. Gear 340 defines central aperture 344 with key slot 346. Thumb knob 348 has barrel portion 380 and knob portion 352. Key 354 is defined along one side of barrel portion 380. Barrel portion 380 extends through adjustment aperture 140 and is received in central aperture 344 with key 354 engaged in key slot 346 to rotationally lock gear 340 with thumb knob 348. In operation, as thumb knob 348 is rotated by a user, gear 340 will translate within channel 194 thereby causing guide structure 44 to move relative to outer frame 168 along the guide structures as before. It will be appreciated that similar arrangements may with used with any of the gear arrangements disclosed herein with the conventional gear may be disposed in channels 194, 244, or above apron portion 296 of yaw coupler 172, operably linked with adjustment knobs on the outside of the mount.

For fine pitch adjustment, friction screw 223 is first loosened slightly and screwdriver shaft 334 is inserted through adjustment aperture 140 so that tip 336 meshes with gear teeth 198 in channel 194 of outer frame 168. When the screwdriver is rotated, shaft 334 bears against the side of adjustment aperture 140, fixing the position of the screwdriver relative to guide assembly 44, while rotation of tip 336 translates gear teeth 198, thereby sliding outer frame 168 along the arcuate path of travel defined by guide assemblies 44, 46, and outer frame 168, and in turn causing device 62 to rotate generally about the x-axis. Once the desired pitch is reached, friction screw 223 is retightened to fix the adjustment in place.

Fine roll adjustment is accomplished by first loosening friction screw 269c and inserting screwdriver shaft 334 through adjustment aperture 222 so that tip 336 meshes with gear teeth 248 in channel 246 of inner frame 170. When the screwdriver is rotated, shaft 334 bears against the side of adjustment aperture 222, fixing the position of the screwdriver relative to outer frame 168, while rotation of tip 336 translates gear teeth 248, thereby sliding inner frame 170 along the arcuate path of travel defined by inner frame 170 and outer frame 168, and in turn causing device 62 to rotate generally about the y-axis. Once the desired roll position is reached, friction screw 269c is retightened to fix the adjustment in place.

Fine yaw adjustment is accomplished by first loosening set screw 332 and inserting screwdriver shaft 334 through adjustment aperture 238 so that tip 336 meshes with gear teeth 298 on yaw coupler 172. When the screwdriver is rotated, shaft 334 bears against the side of adjustment aperture 238, fixing the position of the screwdriver relative to inner frame 170, while rotation of tip 336 translates gear teeth 298, thereby rotating yaw coupler 172 relative to inner frame 170, and in turn causing device 62 to rotate generally about the z-axis. Once the desired yaw position is reached, set screw 332 is retightened to fix the adjustment in place.

In embodiments of the invention, ease of adjustment is further facilitated by attaching device 62 to mount 40 so that one or more of the pitch, roll, and yaw axes extend directly through or proximate the center of gravity of device 62. Particularly with the pitch and roll axes, such positioning offers the advantage of balancing the device so that its weight does not tend to rotate the device about the respective adjustment axis, and thereby affecting the ease and accuracy of the adjustment. For example, device 62 may be attached to mount 40 so that the pitch axis (the x-axis in the Figures), which is defined at the center of the radius of curvature of the arcuate path of travel defined by guide assemblies 44, 46, and outer frame 168, extends through or proximate the center of gravity (annotated C.G. in FIGS. 27-28) of device 62. With device 62 so positioned, the weight of device 62, which acts through its center of gravity, is balanced and does not bias rotation of device 62 about the pitch axis in either rotational direction. When friction screw 223 is loosened to enable pitch adjustment, device 62 will not rotate in either direction until it is manually positioned. Hence, the person performing the adjustment need not hold the device in the desired position as with prior mounts.

The pitch, roll, and yaw axes intersect at a common point below mount 40. Preferably fastening buttons 58 are positioned on device 62 so that the intersection point of the axes coincides or is proximate the center of gravity of device 62.

It will of course be appreciated that in other embodiments according to the invention, only two or none of the pitch, roll, and yaw axes may intersect. In such, embodiments, any one or more of the axes may still be positioned proximate the center of gravity of the mounted device to achieve the benefits described above.

What is claimed is:

1. A mount for attaching a projection device to an overhead structure, the mount comprising:
   a device interface operably attachable to the projection device with a plurality of fasteners, the device interface comprising a first portion and a second portion coupled to the first portion and slidably disposed on the first portion, the first and second portions together defining a plurality of retaining structures, each retaining structure for receiving a separate one of the plurality of fasteners, the device interface further comprising a control, the second portion selectively slidably shiftable with the control relative to the first portion between a first latched position wherein each of the plurality of fasteners is received and retained in a separate one of the retaining structures and a second unlatched position wherein the plurality of fasteners are freely disengagable from the retaining structures of the first and second portions; and
   a device orientation adjustment structure operably coupled with the device interface and adapted to provide adjustment of pitch, roll, and yaw of the projection device, the device orientation adjustment structure including at least one upright extending from the device interface and a support structure interface extending from the at least one upright and having a first portion operably coupled with the upright, the support structure interface adapted to be fixedly coupled with the overhead structure, the upright and the support structure interface having cooperating guide structures defining a first axis of rotation, wherein the device interface is selectively shiftable about the first axis of rotation.

2. The mount of claim 1, wherein each of the first and second portions of the device interface each comprise a plate structure.

3. The mount of claim 2, wherein each retaining structure of the plurality of retaining structures comprises a first notch in a periphery of the plate structure of the first portion and a second corresponding notch in a periphery of the plate structure of the second portion.

4. The mount of claim 1, wherein the control comprises a rotatable lever.

5. The mount of claim 4, wherein each of the first and second portions of the device interface comprise a plate structure, wherein the plate structure of the second portion defines an oblong aperture, and wherein the rotatable lever includes a cam portion disposed in the oblong aperture and operably coupled to the plate of the first portion.

6. The mount of claim 1, further comprising a lock mechanism operably coupled with the device interface, the lock mechanism selectively shiftable between a first unlocked position wherein the second portion of the device interface is freely shiftable relative to the first portion, and a second locked position wherein the lock mechanism inhibits shifting of the second portion from the latched to the unlatched position.

7. The mount of claim 6, wherein the lock mechanism includes a lock cylinder with structure for receiving a key, the lock structure rotatable with the key to shift the lock mechanism between the locked and unlocked positions.

8. The mount of claim 1, wherein the at least one upright is secured to the device interface with at least one fastener, and wherein the at least one fastener is inaccessible for removal when the projection device is attached to the device interface.

9. The mount of claim 1, wherein the support structure interface includes a second portion, the first and second portions of the support structure interface operably coupled so as to define a second axis of rotation generally transverse to the first axis of rotation, wherein the device interface is separately selectively shiftable about both the first and second axes of rotation when the support structure interface is fixedly coupled with the overhead structure.

10. The mount of claim 9, further comprising a retaining structure for retaining the first and second portions support structure interface in operable engagement, wherein the retaining structure secured with at least one fastener, and wherein the at least one fastener securing the retaining structure is inaccessible for removal when the projection device is attached to the device interface.

11. A mount for attaching a projection device to an overhead structure, the mount comprising:
   a device interface operably attachable to the projection device with at least one fastener, the device interface comprising a first portion and a second portion having cooperating means for selectively engaging the at least one fastener to couple and uncouple the projection device, the first and second portions coupled to one another in slidable non-separable relation by at least one fastener member disposed between apertures and slots in the first and second portions, wherein the first and second portions of the device interface each comprise a plate structure, and wherein the means for selectively engaging the at least one fastener includes a first notch in a periphery of the plate structure of the first portion and a second corresponding notch in a periphery of the plate structure of the second portion, the plate structures selectively slidably shiftable relative to each other between a first latched position wherein the at least one fastener is engaged and retained in and the first second notches and an unlatched position in which the at least one fastener is freely removable from the first second notches; and
   a device orientation adjustment structure operably coupled with the device interface and adapted to provide adjustment of pitch, roll, and yaw of the projection device, the device orientation adjustment structure including at least one upright extending from the device interface and a support structure interface extending from the at least one upright and having a first portion operably coupled with the upright, the support structure interface adapted to be fixedly coupled with the overhead structure, the at least one upright and the support structure interface having cooperating guide structures defining a first axis of rotation, wherein the device interface is selectively shiftable about the first axis of rotation.

12. The mount of claim 11, further comprising means for selectively shifting the plate structures relative to each other.

13. The mount of claim 12, wherein the means for selectively shifting the plate structures relative to each other comprises a rotatable lever.

14. The mount of claim 13, wherein the plate structure of the second portion defines an oblong aperture, and wherein the rotatable lever includes a cam portion disposed in the oblong aperture and operably coupled to the plate of the first portion.

15. The mount of claim 11, further comprising means for selectively inhibiting sliding of the plate structures.

16. The mount of claim 15, wherein the means for selectively inhibiting sliding of the plate structures comprises a lock mechanism.

17. The mount of claim 16, wherein the lock mechanism includes structure for receiving a key, and wherein the lock mechanism is actuated with the key.

18. The mount of claim 11, wherein the at least one upright is secured to the device interface with at least one fastener, and wherein the at least one fastener is inaccessible for removal when the projection device is attached to the device interface.

19. The mount of claim 11, wherein the support structure interface includes a second portion, the first and second portions of the support structure interface operably coupled so as to define a second axis of rotation generally transverse to the first axis of rotation, wherein the device interface is separately selectively shiftable about both the first and second axes of rotation when the support structure interface is fixedly coupled with the overhead structure.

20. The mount of claim 19, further comprising a retaining structure for retaining the first and second portions support structure interface in operable engagement, wherein the retaining structure secured with at least one fastener, and wherein the at least one fastener securing the retaining structure is inaccessible for removal when the projection device is attached to the device interface.

* * * * *